(12) United States Patent
Yang et al.

(10) Patent No.: US 11,609,643 B2
(45) Date of Patent: Mar. 21, 2023

(54) OPTICAL PROCESSING APPARATUS AND OPERATING METHOD OF WATCH

(71) Applicant: PixArt Imaging Inc., Hsin-Chu County (TW)

(72) Inventors: Chung-Ting Yang, Hsin-Chu County (TW); Ching-Lin Chung, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 17/502,237

(22) Filed: Oct. 15, 2021

(65) Prior Publication Data

US 2022/0035459 A1 Feb. 3, 2022

Related U.S. Application Data

(60) Continuation of application No. 16/694,167, filed on Nov. 25, 2019, now Pat. No. 11,175,747, which is a
(Continued)

(30) Foreign Application Priority Data

Feb. 4, 2013 (TW) .................................. 102104112
Dec. 1, 2017 (TW) .................................. 106142281

(51) Int. Cl.
*G06F 3/03* (2006.01)
*G04G 21/02* (2010.01)
(Continued)

(52) U.S. Cl.
CPC ............ *G06F 3/0312* (2013.01); *G04G 21/00* (2013.01); *G04G 21/025* (2013.01); *G06F 1/163* (2013.01);
(Continued)

(58) Field of Classification Search
CPC ........... G01D 5/34707; G01D 5/34715; G01D 5/3473; G01D 5/34776; G01D 5/34784;
(Continued)

(56) References Cited

U.S. PATENT DOCUMENTS 4,420,263 A * 12/1983 Besson .................... G04G 7/00
368/80
5,231,612 A * 7/1993 Allgaier ................... G04C 3/14
368/187
(Continued)

*Primary Examiner* — John R Lee
(74) *Attorney, Agent, or Firm* — Hauptman Ham, LLP

(57) ABSTRACT

An optical processing apparatus and a light source luminance adjustment method adapted to detect a rotational displacement and a pressing state are provided. The optical processing apparatus includes a light source unit, a processing unit, and an image sensing unit, wherein the processing unit is electrically connected to the light source unit and the image sensing unit. The light source unit provides a beam of light. The processing unit defines a frame rate, defines a plurality of time instants within a time interval, and sets the light source unit to a luminance value at each of the time instants. A length of the time interval is shorter than the reciprocal of the frame rate. The luminance values are different and are within a range. The image sensing unit captures an image by an exposure time length at each of the time instants, wherein the exposure time lengths are the same.

14 Claims, 16 Drawing Sheets

Related U.S. Application Data continuation-in-part of application No. 16/260,317, filed on Jan. 29, 2019, now Pat. No. 10,521,023, which is a continuation of application No. 15/417,728, filed on Jan. 27, 2017, now Pat. No. 10,241,593, which is a continuation-in-part of application No. 15/240,120, filed on Aug. 18, 2016, now Pat. No. 9,606,636, which is a division of application No. 13/959,225, filed on Aug. 5, 2013, now Pat. No. 9,578,253, said application No. 16/694,167 is a continuation-in-part of application No. 15/939,523, filed on Mar. 29, 2018, now abandoned.

(51) Int. Cl.
| | |
|---|---|
| *G06F 3/0362* | (2013.01) |
| *G06T 7/00* | (2017.01) |
| *H04N 5/235* | (2006.01) |
| *G06F 1/16* | (2006.01) |
| *G04G 21/00* | (2010.01) |

(52) U.S. Cl.
CPC ............ *G06F 1/169* (2013.01); *G06F 3/0304* (2013.01); *G06F 3/0362* (2013.01); *G06T 7/0002* (2013.01); *H04N 5/2351* (2013.01); *H04N 5/2353* (2013.01); *H04N 5/2354* (2013.01); *H04N 5/2356* (2013.01); *G06T 2207/10144* (2013.01); *G06T 2207/30168* (2013.01)

(58) Field of Classification Search
CPC ..... G01D 5/347; G06F 3/0312; G06F 3/0304; G06F 3/03; G06F 1/163; G06F 1/169; G06F 3/0362; G04G 21/00; G04G 21/08; G04G 21/025; G04G 21/02; G06T 7/0002; G06T 2207/10144; G06T 2207/30168; H04N 5/2351; H04N 5/2354; H04N 5/2356
See application file for complete search history.

(56) References Cited

U.S. PATENT DOCUMENTS

| | | | | |
|---|---|---|---|---|
| 5,270,993 A * | 12/1993 | Besson | | G04C 3/14 368/80 |
| 5,734,474 A * | 3/1998 | Haecker | | G04C 3/14 356/623 |
| 6,473,367 B2 * | 10/2002 | Peng | | G04C 9/00 368/79 |
| 6,575,618 B1 * | 6/2003 | Inoue | | G04B 19/283 368/69 |
| 6,731,571 B2 * | 5/2004 | Yiu | | G04C 3/14 368/79 |
| 6,804,173 B2 * | 10/2004 | Yiu | | G04C 3/14 368/220 |
| 6,894,952 B2 * | 5/2005 | Morokawa | | G04C 3/008 368/80 |
| 7,957,008 B2 * | 6/2011 | Hosobuchi | | G04C 3/14 356/426 |
| 7,961,557 B2 * | 6/2011 | Fujii | | G04C 3/14 368/80 |
| 8,467,274 B2 * | 6/2013 | Aoki | | G04R 60/14 368/80 |
| 8,714,812 B2 * | 5/2014 | Aoki | | G04C 3/143 368/187 |
| 9,336,619 B2 * | 5/2016 | Kim | | H04N 5/23229 |
| 9,578,253 B2 * | 2/2017 | Chen | | H04N 5/2353 |
| 9,606,636 B2 * | 3/2017 | Chen | | G06F 3/0308 |
| 9,904,252 B2 * | 2/2018 | Kato | | G04R 20/08 |
| 10,241,593 B2 * | 3/2019 | Chen | | G06T 7/0002 |
| 10,521,023 B2 * | 12/2019 | Chen | | H04N 5/2353 |
| 11,029,764 B2 * | 6/2021 | Yang | | G04F 3/06 |
| 11,175,747 B2 * | 11/2021 | Yang | | H04N 5/2351 |
| 2004/0120221 A1 * | 6/2004 | Ogasawara | | G04C 3/14 368/80 |
| 2006/0255152 A1 * | 11/2006 | Xie | | G06F 3/0317 250/221 |
| 2006/0267945 A1 * | 11/2006 | Huang | | G06F 3/03543 345/166 |
| 2008/0062149 A1 * | 3/2008 | Baruk | | G06F 3/0421 345/175 |
| 2009/0195505 A1 * | 8/2009 | Chen | | G06F 1/3259 345/166 |
| 2009/0296533 A1 * | 12/2009 | Kojima | | G04G 19/12 368/185 |
| 2010/0078303 A1 * | 4/2010 | Larsen | | H01H 13/705 200/5 A |
| 2010/0195935 A1 * | 8/2010 | Brosnan | | G06F 3/0317 382/321 |
| 2011/0037725 A1 * | 2/2011 | Pryor | | B60K 37/06 345/173 |
| 2011/0240836 A1 * | 10/2011 | Phan Le | | G06F 3/0362 250/230 |
| 2012/0127128 A1 * | 5/2012 | Large | | G06F 3/0425 345/175 |
| 2012/0274606 A1 * | 11/2012 | Song | | G06F 3/03547 178/18.09 |
| 2013/0010576 A1 * | 1/2013 | Fung | | G04C 17/00 368/17 |
| 2014/0014839 A1 * | 1/2014 | Chang | | G06F 3/017 250/338.4 |
| 2015/0116730 A1 * | 4/2015 | Tortora | | G04B 19/042 356/614 |
| 2016/0109861 A1 * | 4/2016 | Kim | | G04G 9/00 368/69 |
| 2017/0089736 A1 * | 3/2017 | Rai | | G01D 11/24 |
| 2019/0155403 A1 * | 5/2019 | Chen | | G06F 3/0312 |
| 2019/0170542 A1 * | 6/2019 | Yang | | G01D 18/00 |
| 2020/0089331 A1 * | 3/2020 | Yang | | G04G 21/00 |
| 2021/0199475 A1 * | 7/2021 | Dantler | | G01D 5/34792 |
| 2022/0035459 A1 * | 2/2022 | Yang | | H04N 5/2256 |

\* cited by examiner

OPTICAL PROCESSING APPARATUS AND OPERATING METHOD OF WATCH

CROSS-REFERENCES TO RELATED APPLICATIONS

This application is a continuation application of U.S. patent application Ser. No. 16/694,167 filed on, Nov. 25, 2019, which is a continuation-in-part application of U.S. patent application Ser. No. 16/260,317 filed on, Jan. 29, 2019, which is a continuation application of U.S. patent application Ser. No. 15/417,728 filed on, Jan. 27, 2017, which is a continuation-in-part application of U.S. patent application Ser. No. 15/240,120 filed on, Aug. 18, 2016, and the entire contents of which are incorporated herein by reference. The Ser. No. 15/240,120 application is a divisional application of U.S. patent application Ser. No. 13/959,225, filed on Aug. 5, 2013, and the entire contents of which are incorporated herein by reference. The Ser. No. 13/959,225 application claimed the benefit of the date of the earlier filed Taiwan Patent Application No. 102104112 filed on Feb. 4, 2013, priority to which is also claimed herein, and the contents of which are also incorporated by reference herein. The Ser. No. 16/694,167 application is also a continuation-in-part application of U.S. patent application Ser. No. 15/939,523 filed on, Mar. 29, 2018. The Ser. No. 15/939,523 application claimed the benefit of the date of the earlier filed Taiwan Patent Application No. 106142281, filed on Dec. 1, 2017, priority to which is also claimed herein, and the contents of which are also incorporated by reference herein.

BACKGROUND OF THE INVENTION

Field of the Invention

The present invention relates to an optical processing apparatus, a light source luminance adjustment method, and a non-transitory computer readable medium thereof. More particularly, the present invention relates to an optical processing apparatus, a light source luminance adjustment method, and a non-transitory computer readable medium thereof that can adjust the luminance settings of a light source according to the image quality.

Descriptions of the Related Art

With the development of science and technologies, optical touch control technologies have gradually found application in various fields. Accordingly, various kinds of optical processing apparatuses such as optical navigation apparatuses, optical touch panels, and the like, have been developed.

In conventional optical processing apparatuses, a light source unit is used to project a beam of light onto a reflective surface. An image is captured by an image sensing unit so that a processing unit can execute subsequent operations according to the captured image. For example, if the optical processing apparatus is an optical navigation apparatus, a processing unit thereof compares the images that are consecutively captured to determine the amount of displacement of the optical navigation apparatus within a time interval. Then, a cursor displayed on the screen is controlled according to the amount of displacement for navigation purposes. As can be seen from this, the result of the processing unit is determined by the quality of the images captured by the image sensing unit. For example, for some optical processing apparatuses, images that are too bright or too dark will have an adverse effect on the result of the subsequent determination and be considered to have poor quality.

One conventional optical processing apparatuses has improved the aforesaid problem by adjusting the exposure time length used to capture images. Specifically, the exposure time length used to capture the subsequent image will be reduced when the captured image is too bright. Conversely, the exposure time length used to capture the subsequent image will be extended when the captured image is too dark. However, when this practice is adopted, the frame rate of the optical processing apparatus will be limited if the exposure time length becomes too long.

Another conventional optical processing apparatuses that has improved the aforesaid problem adjusts the gain value of the programmable gain amplifier (PGA). Specifically, the gain value used to capture the subsequent image will be reduced when the captured image is too bright. Conversely, the gain value used to capture the subsequent image will be increased when the captured image is too dark. However, too great a gain value will cause too many noises in the image, which undesirably makes the image quality poorer instead.

Accordingly, it is important to provide a technology capable of adjusting the settings of an optical processing apparatus according to the quality of the captured image. In case of poor image quality, the optical processing apparatus can still adjust the settings to make the quality of the subsequent captured images desirable. In this way, the optical processing apparatus or other apparatuses that are used with the optical processing apparatus can use an image that has a desirable quality for subsequent determinations and operations.

SUMMARY OF THE INVENTION

To improve the aforesaid problems, the present invention provides an optical processing apparatus, a light source luminance adjustment method, and a non-transitory computer readable medium thereof.

The present disclosure provides an optical processing apparatus including a light source, an image sensor and a processor. The light source is configured to provide a beam of light to go through a through hole of a rotary shaft to a surface of a rotary part of a button to generate a reflected light beam reflected from the surface of the rotary part of the button. The image sensor is configured to capture the reflected light beam to output a first image of the surface of the rotary part of the button by an exposure time length within each frame capturing period. The processor is configured to calculate an image quality index of the first image, compare the image quality index of the first image with at least one press threshold to identify a pressing state of the button within the each frame capturing period, calculate a rotational displacement of the button using first image frames of the each frame capturing period, and when identifying that the pressing state of the button is between press and non-press by comparing the image quality index with the at least one press threshold, take the rotational displacement calculated between the press and the non-press as undesired movement.

The present disclosure further provides an operating method of a watch, which includes a light source, an image sensor and a processor. The operating method includes the steps of: providing, by the light source, a beam of light to go through a through hole of a rotary shaft to a surface of a rotary part of a button to generate a reflected light beam reflected from the surface of the rotary part of the button; capturing, by the image sensor, the reflected light beam to output a first image of the surface of the button within each frame capturing period; calculating, by the processor, an image quality index of the first image; comparing, by the processor, the image quality index of the first image with at least one press threshold to identify a pressing state of the button within the each frame capturing period; calculating a rotational displacement of the button using first images of the each frame capturing period; and stop outputting the calculated rotational displacement when the pressing state of the button is identified between press and non-press by comparing the image quality index with the at least one press threshold.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the optical processing apparatus, the light source luminance adjustment method, and the non-transitory computer readable medium thereof according to the present invention will be explained with reference to embodiments thereof. However, these embodiments are not intended to limit the present invention to any specific environment, applications, or particular implementations described in these embodiments. Therefore, the description of these embodiments is only for the purpose of illustration rather than limitation. It should be appreciated that elements unrelated to the present invention are omitted from depiction in the following embodiments and the attached drawings.

Figure 1A:
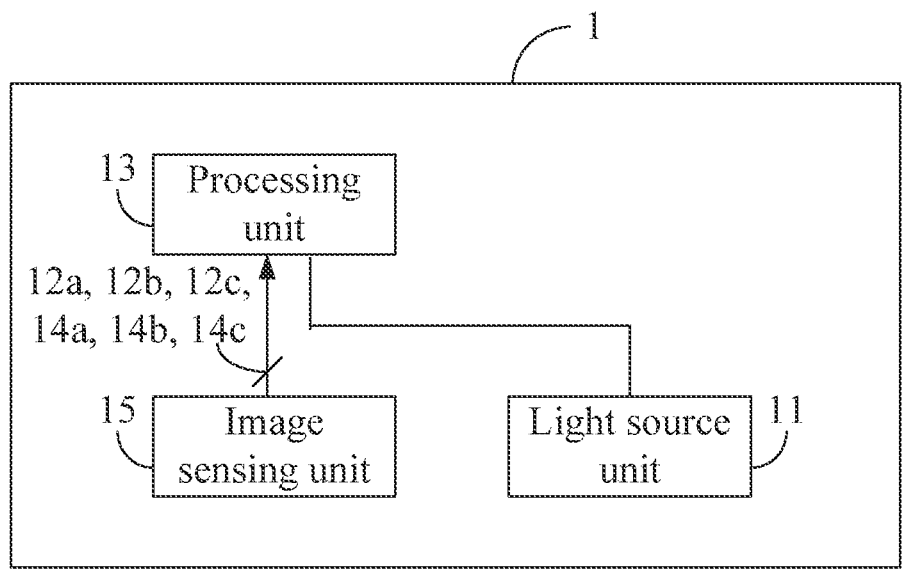
FIG. 1A is a schematic view depicting an optical processing apparatus 1 according to the first embodiment.

The first embodiment of the present invention is an optical processing apparatus 1, a schematic view of which is depicted in FIG. 1A. The optical processing apparatus 1 comprises a light source unit 11, a processing unit 13, and an image sensing unit 15. The processing unit 13 is electrically connected to the light source unit 11 and the image sensing unit 15.

The light source unit 11 may be a light emitting diode (LED) or some other light source units well-known to those of ordinary skill in the art. The processing unit 13 may be of any various processors, central processing units (CPUs), microprocessors, or other computing devices well-known to those of ordinary skill in the art. The image sensing unit 15 may be a complementary metal oxide semiconductor (CMOS) light sensing unit or an image sensing unit well-known to those of ordinary skill in the art.

When the optical processing apparatus 1 is powered on, the light source unit 11 generates a beam of light (not shown) of identifiable spectrum, while the processing unit 13 and the image sensing unit 15 perform operations provided by the present invention.

Figure 1B:
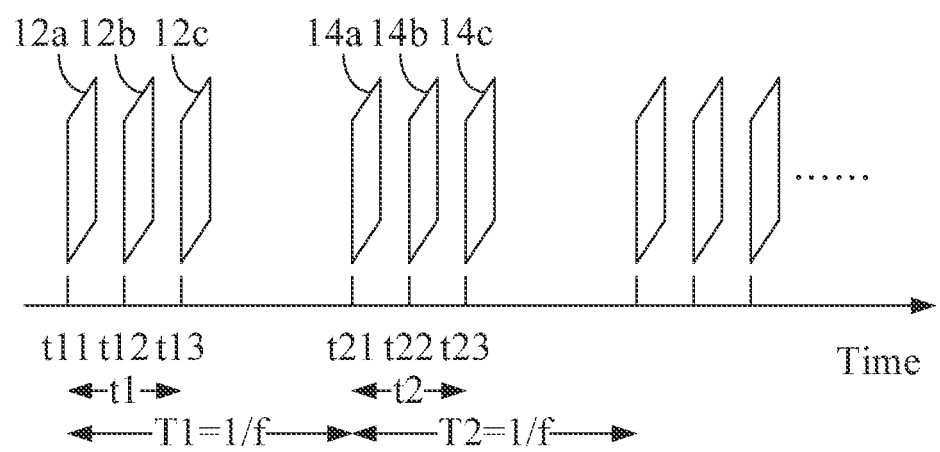
FIG. 1B is a schematic view depicting relationships between frame capturing periods, time intervals and images.

In this embodiment, the processing unit 13 defines a frame rate f. The frame rate f is the reciprocal of the frame capturing periods T1, T2 as shown in FIG. 1B. The time lengths of the frame capturing periods T1 and T2 are the same. It is noted that the frame capturing periods T1 and T2 being denoted as different reference symbols are only for indicating that they correspond to different frame capturing periods. The processing unit 13 defines a time interval t1 within the frame capturing period T1 and defines a plurality of time instants t11, t12, and t13 within the time interval t1. The time length of the time interval t1 is shorter than the time length of the frame capturing period T1. In other words, the time length of the time interval t1 is shorter than the reciprocal of the frame rate f.

The processing unit 13 sets the light beam provided by the light source unit 11 to a luminance value at each of the time instants t11, t12, and t13. It should be appreciated that the light beam of the light source unit 11 is set to different luminance values at each of the time instants t11, t12, and t13. The luminance values are within a first range. A specific example will now be described for illustration. It is assumed that the light source unit 11 has ten selectable different levels of luminance values and three levels (i.e., level 4 to level 6) of them are within the default range. When the optical processing apparatus 1 is powered on, the first range may be set to the default range. The light source luminance values set for the light source unit 11 at the time instants t11, t12, and t13 are respectively on level 4, level 5, and level 6 of the first range.

On the other hand, the image sensing unit 15 captures images 12a, 12b, and 12c respectively by the exposure time length at each of the time instants t11, t12, and t13. The exposure time lengths used to capture the images 12a, 12b, and 12c are the same. The above specific example is continued for illustration. The light source luminance value of the light source unit 11 is on level 4 at the time instant t11. The image sensing unit 15 captures the image 12a at this time instant.

Subsequently, the processing unit 13 calculates the image quality index of each of the images 12a, 12b, and 12c. The image quality index of each of the images 12a, 12b, and 12c may be a feature value (e.g., the number of pairs of bright and dark spots) and a luminance value (or referred to image intensity) of the corresponding image or other information value which can be used to determine the image quality. The processing unit 13 further derives a comparison result by comparing the image quality indices of the images 12a, 12b, and 12c with at least one threshold, i.e. at least one quality threshold.

For example, when the image quality index is a feature value of the image, a higher image quality index represents a better image quality. In such a case, the processing unit 13 may derive the comparison result by comparing the image quality indices of the images 12a, 12b, and 12c with a threshold. The comparison result may indicate which images have image quality indices higher than the threshold and the sequence of those images.

As another example, when the image quality index is the luminance value or image intensity (e.g., an averaged luminance value or averaged image intensity), image quality indices falling within a luminance value range (i.e., values between an upper threshold and lower threshold) represent good image qualities, whereas image quality indices that are too high (higher than the upper threshold) or too low (lower than the lower threshold) represent bad image qualities. In such a case, the processing unit 13 may derive the comparison result by comparing the image quality indices of the images 12a, 12b, and 12c with the two thresholds (i.e. the upper and lower thresholds). This comparison result may indicate which images have image quality indices between the two thresholds.

No matter what kind of information the image is used as the image quality index, the aforesaid comparison results can be classified into two categories. One category is that at least a part of the image quality indices meet the requirements (i.e., at least a part of the images 12a, 12b, and 12c meeting the at least one quality threshold to have good image qualities), while the other category is that none of the image quality indices meets the requirements (i.e., the images 12a, 12b, and 12c all failing to meet the at least one quality threshold to have bad image qualities). In the following description, the method in which the processing unit 13 subsequently determines the first selected image representing the time interval t1 and determines the second range of light source luminance values used by the light source unit 11 within the time interval t2 of the next frame capturing period T2 will be described with respect to each of the two classes respectively.

Now, the first class (i.e., the case in which at least a part of the image quality indices meet the requirement) will be described firstly. The processing unit 13 selects one of the images 12a, 12b, and 12c as a first selected image (e.g., the image 12c) representing the time interval t1 according to the comparison result. The first selected image can be considered as the image representing the frame capturing period T1. In particular, the processing unit 13 selects the image represented by one of the image quality indices that meet the requirement as the first selected image according to the comparison result. In the case that the image quality index is the feature value, the processing unit 13 selects the image represented by any one of the image quality indices that are higher than the threshold as the first selected image. In the case that the image quality index is the luminance value of the image, the processing unit 13 selects the image represented by any one of the image quality indices ranging between the upper threshold and the lower threshold as the first selected image. In one embodiment, the selected first image representing the frame capturing period T1 is used to calculate displacement of the optical processing apparatus 1 with respect to a reflective surface.

If the optical processing apparatus 1 continuous operating, the processing unit 13 defines a time interval t2 within the frame capturing period T2 immediately after the frame capturing period T1. The time interval t2 occurs later than the time interval t1. Furthermore, the time length of the aforesaid time interval t2 is shorter than the time length of the frame capturing period T2. In other words, the time length of the time interval t2 is shorter than the reciprocal of the frame rate f.

The processing unit 13 sets a basic luminance value of the time interval t2 to the luminance value corresponding to the first selected image and determines a second range according to this basic luminance value. For example, the second range may comprise the basic luminance value as well as luminance values of one (or more) previous level and one (or more) subsequent level. Assuming that the first selected image is the image 12c and the image 12c is captured under conditions that the light source luminance value of the light source unit 11 is on level 6, then the basic luminance value of the time interval t2 is on level 6 while the second range ranges are between level 5 to level 7.

Subsequently, the second class (i.e., the case in which none of the image quality indices meets the requirement) will be described. Since the comparison result indicates that none of the image quality indices meets the requirement, the processing unit 13 selects more than one of the images 12a, 12b and 12c as a plurality of first temporary images according to this comparison result. Then, the processing unit 13 derives an averaged image by averaging the first temporary images and sets the averaged image as the first selected image representing the time interval t1. The first selected image can also be considered as the image representing the frame capturing period T1. Similarly, the selected first image representing the frame capturing period T1 is used to calculate displacement of the optical processing apparatus 1 with respect to a reflective surface.

Similarly, if the optical processing apparatus 1 continuous operating, the processing unit 13 defines the time interval t2 within the frame capturing period T2 immediately after the frame capturing period T1. The time interval t2 occurs later than the time interval t1. Furthermore, the time length of the aforesaid time interval t2 is shorter than the time length of the frame capturing period T2. In other words, the time length of the aforesaid time interval t2 is shorter than the reciprocal of the frame rate f.

In such a case, the processing unit 13 determines the second range of the light source luminance value to be set for the light source unit 11 within the time interval t2. Since none of the image quality indices of the images 12a, 12b and 12c meets the requirement, the processing unit 13 adjusts the second range on the basis of the first range. For example, if the image quality index is the luminance value of the image and all of the image quality indices are lower than the lower threshold (i.e., the images 12a, 12b and 12c are too dark), the processing unit 13 may adjust each luminance value level within the first range to be higher by a predetermined number of levels and use the adjusted luminance value levels as the second range (e.g., when the first range is between level 4 to level 6, the second range may be set from level 6 to level 8), or may add one more level to the luminance value levels contained in the first range (e.g., when the first range is between level 4 to level 6, the second range may be set from level 4 to level 7). In the case that the image quality index is the luminance value of the image and all of the image quality indices are higher than the upper threshold, a reverse process can be performed. In the case that the image quality index is the feature value of the image and all of the image quality indices are lower than the lower threshold, the processing unit 13 may also adjust each luminance value level within the first range to be higher with a predetermined number of levels. In addition, the adjusted luminance value levels may be used as the second range, or may add one more level to the luminance levels contained in the first range.

After the processing unit 13 has determined the second range of the light source luminance value to be used by the light source unit 11 within the time interval t2 of the next frame capturing period T2, a subsequent operation will be described next.

The processing unit 13 defines a plurality of time instants t21, t22 and t23 within the time interval t2. It should be appreciated that the number of time instants defined within the time interval t2 is the same as the number of the light source luminance value levels within the second range. Subsequently, the processing unit 13 sets the light beam provided by the light source unit 11 to a luminance value at each of the time instants t21, t22 and t23. It should be appreciated that the light source luminance values set for the light source unit 11 at each of the time instants t21, t22 and t23 are different and are within the second range. On the other hand, the image sensing unit 15 captures images 14a, 14b and 14c respectively by the same exposure time length at each of the time instants t21, t22 and t23.

Similarly, the processing unit 13 then calculates the image quality index of each of the images 14a, 14b and 14c. The image quality index of each of the images 14a, 14b and 14c may be the feature value, luminance value (or referred to image intensity) of the corresponding image or other informational value that can be used to determine the image quality. The processing unit 13 further derives a comparison result by comparing the image quality indices of the images 14a, 14b and 14c with at least one threshold. Afterwards, the processing unit 13 further selects a second selected image representing the time interval t2 according to the comparison result. For example, the processing unit 13 selects one of the images 14a, 14b and 14c as a second selected image (e.g., the image 14b) representing the time interval t2, or sets an averaged image of the images 14a, 14b and 14c as the second selected image. The second selected image can also be considered as the image representing the frame capturing period T2. In one embodiment, the selected second image representing the frame capturing period T2 is used to calculate displacement of the optical processing apparatus 1 with respect to a reflective surface, e.g., by comparing the selected first image representing the frame capturing period T1 and the selected second image representing the frame capturing period T2. If the optical processing apparatus 1 continuous operating, operations similar to what has been described above can be repeated.

It should be appreciated that in this embodiment, the lengths of the time intervals defined by the processing unit 13 within different frame capturing periods are not necessarily the same as long as the lengths of the time intervals are shorter than the frame capturing periods (i.e., the reciprocal of the frame rate). Furthermore, the numbers of time instants defined by the processing unit 13 within different time intervals are not necessarily the same. In other words, the numbers of images captured by the image sensing unit 15 within different time intervals are not necessarily the same.

For example, when images captured within the time intervals of a certain frame capturing period all have good qualities, it can be expected that images to be captured by the image sensing unit 15 within the next frame capturing period will also have good image qualities. Then the processing unit 13 may define fewer time instants within the time intervals of the next frame capturing period to decrease the number of images to be captured by the image sensing unit 15. With such a configuration, the resources consumed by the optical processing apparatus 1 can be duly reduced.

As can be seen from the above descriptions, the optical processing apparatus 1 defines a time interval within each frame capturing period, captures multiple images with different light source luminance values within this time interval, and further calculates the image quality index of each image. When at least a part of the images have good qualities, the optical processing apparatus 1 selects an image with good image quality as the image representing this time interval, e.g., for calculating displacement. The light source luminance value, which is used to capture the image with good image quality, is then set as the basic luminance value to be used by the light source unit within the next frame capturing period. When all of the images have bad qualities, the optical processing apparatus selects the averaged image of these images as the image representing this time interval, e.g., for calculating displacement, and duly adjusts the range of the light source luminance values to be used within the next frame capturing period. Since the range of the luminance values to be used by the light source unit within the next frame capturing period is adjusted based on the image qualities, it can be expected that images to be captured by the image sensing unit 15 within the next frame capturing period will have preferable image qualities.

Furthermore, since the optical processing apparatus 1 adjusts the light source luminance value of the light source unit instead of adjusting the exposure time length used to capture images or adjusting the gain value of a programmable gain amplifier, the optical processing apparatus 1 does not have the shortcomings of the prior art.

Figure 2A:
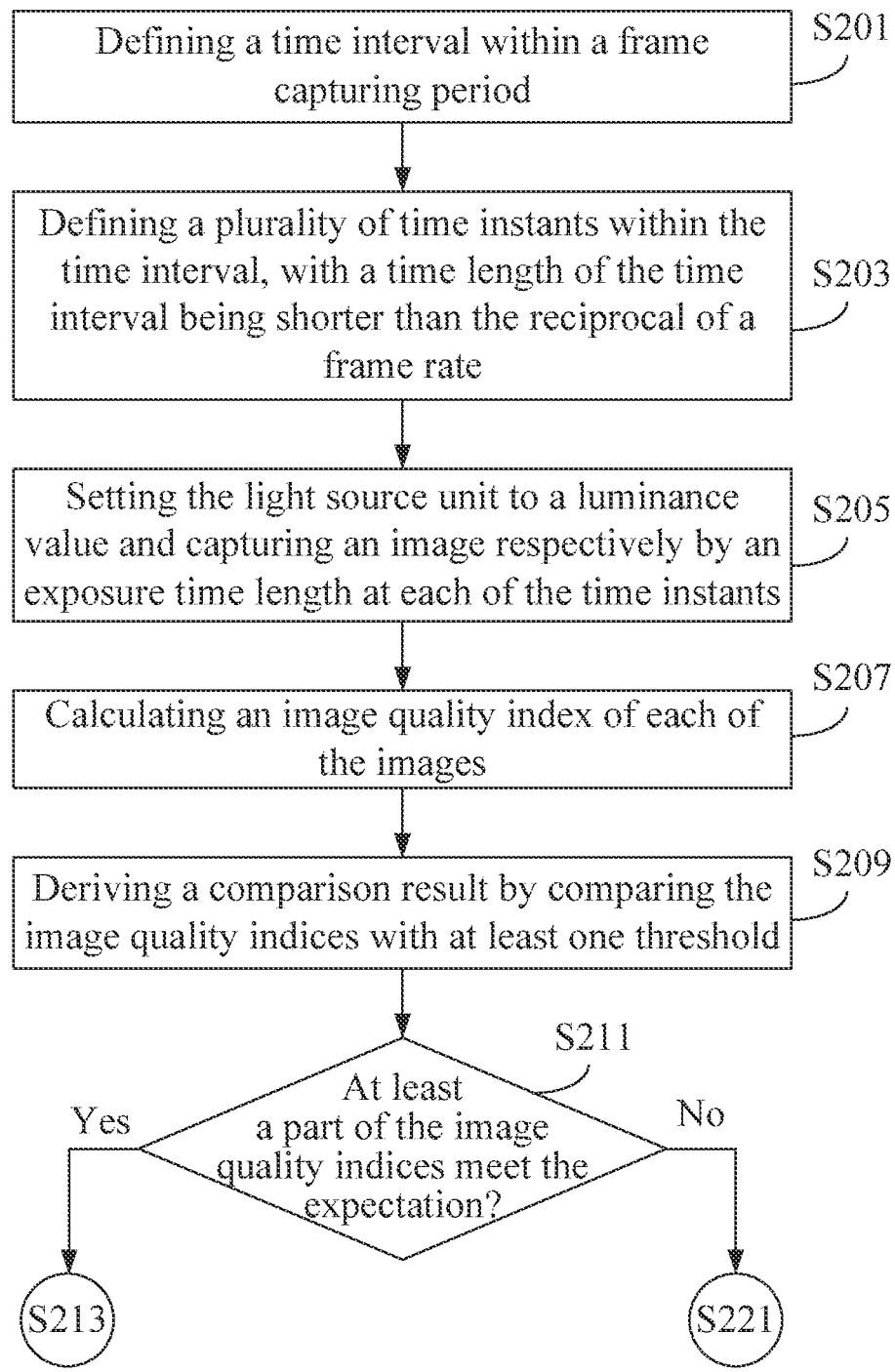
FIGS. 2A, 2B and 2C are flowchart diagrams depicting the second embodiment.
Figure 2B:
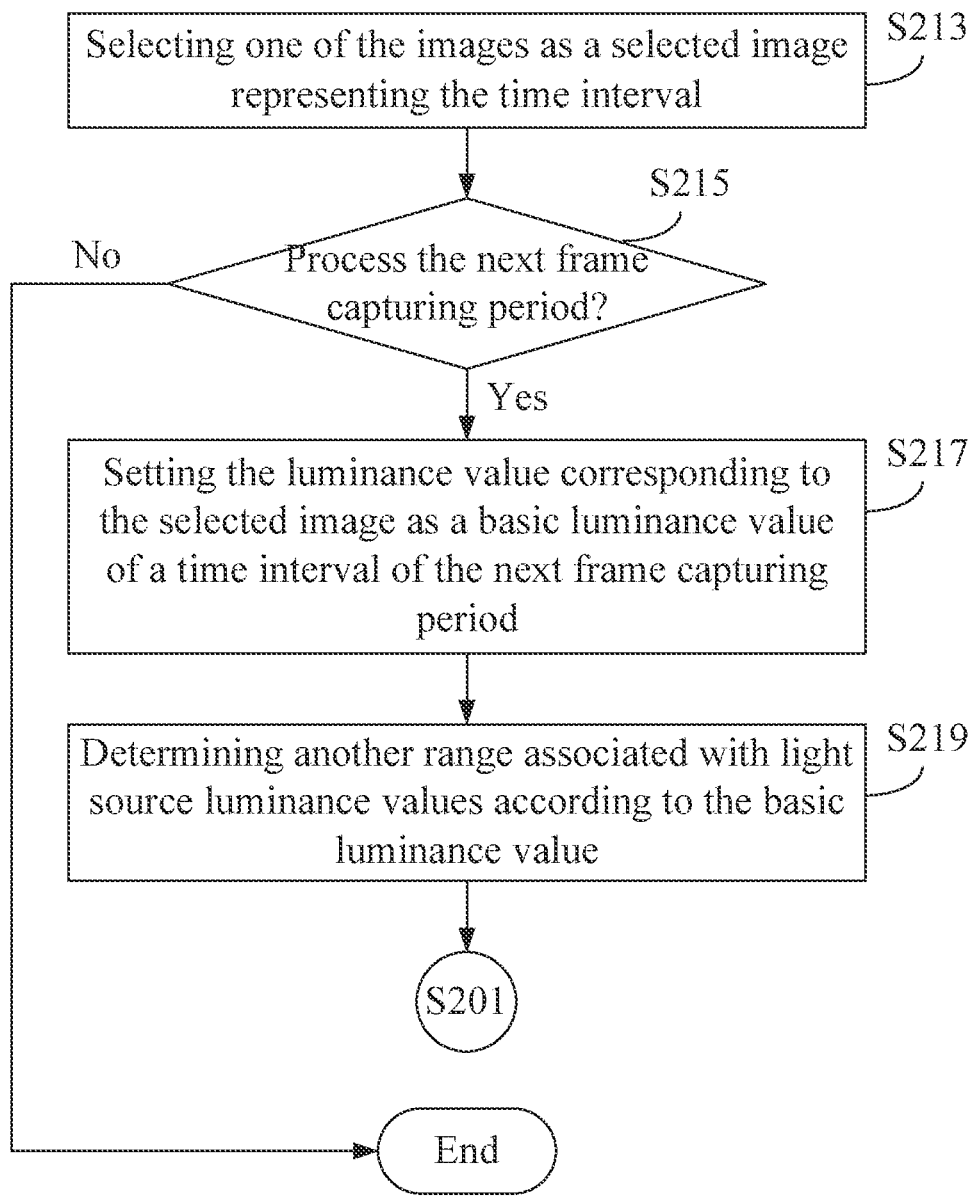
Figure 2C:
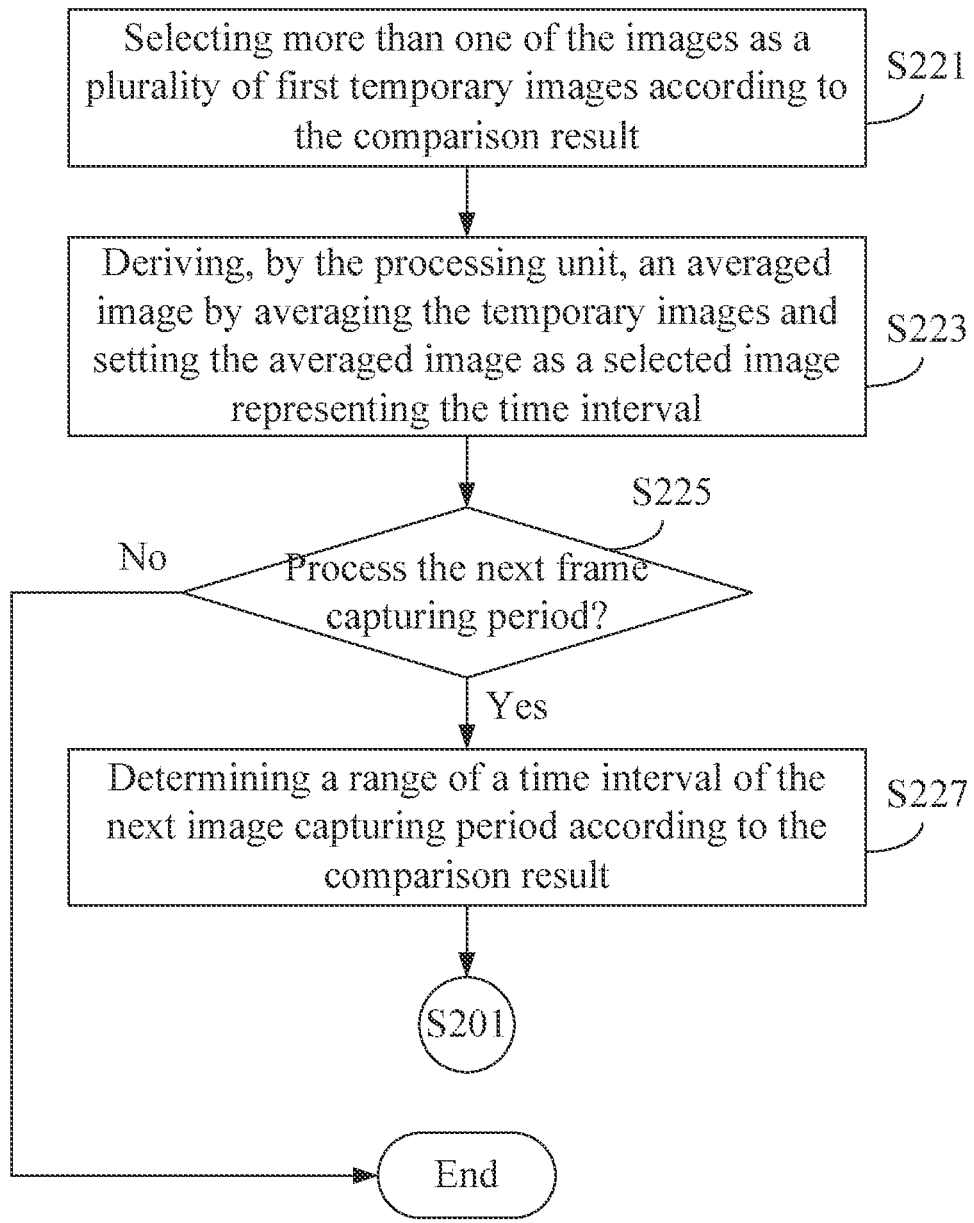

The second embodiment of the present invention is a light source luminance adjustment method, a flowchart diagram of which is depicted in FIGS. 2A, 2B and 2C. The light source luminance adjustment method is adapted for use in an optical processing apparatus (e.g., the optical processing apparatus 1 of the first embodiment). The optical processing apparatus comprises a light source unit, an image sensing unit, and a processing unit. The light source unit provides a beam of light, while the processing unit defines a frame rate.

The light source luminance adjustment method first executes step S201 to define, by the processing unit, a time interval within a frame capturing period. Subsequently, step S203 is executed to define, by the processing unit, a plurality of time instants within the time interval, with the time length of the time interval being shorter than the reciprocal of the frame rate.

Then, step S205 is executed to set, by the processing unit, the light source unit to a luminance value and to capture, by the image sensing unit, an image by an exposure time length at each of the time instants. It should be appreciated that the luminance values set at different time instants are different and are within a range. Furthermore, the exposure time lengths used to capture images at different time instants are the same. Subsequently, step S207 is executed to calculate, by the processing unit, an image quality index of each of the images. Then, step S209 is executed to derive, by the processing unit, a comparison result by comparing the image quality indices with at least one threshold.

Subsequently, step S211 is executed to determine whether at least a part of the image quality indices meet the requirement (i.e., whether at least a part of the images captured in step S205 have good image qualities) according to the comparison result. If the answer is "yes", step S213 is executed to select, by the processing unit, one of the images as a selected image representing the time interval according to the comparison result. More particularly, in step S213, the image corresponding to the image quality index that meets the requirement is selected as the selected image.

Then, step S215 is executed to determine, by the processing unit, whether to process the next frame capturing period. If the answer is "yes", step S217 is executed to set, by the processing unit, a basic luminance value of a time interval of the next frame capturing period to the luminance value corresponding to the selected image. Subsequently, step S219 is executed to determine, by the processing unit, another range of light source luminance values according to the basic luminance value. Then, step S201 is executed again. If the determination result of step S215 is no, the light source luminance adjustment method is finished.

If the determination result of step S211 is no (i.e., none of the image quality indices meets the requirement, or in other words, images captured in step S205 all have bad image qualities), step S221 is executed.

In step S221, the processing unit selects more than one of the images as a plurality of first temporary images according to the comparison result. More particularly, the processing unit may select all of the images as the temporary images. Subsequently, in step S223, the processing unit derives an averaged image by averaging the temporary images and sets the averaged image as the selected image representing the time interval.

Then, step S225 is executed to determine, by the processing unit, whether to process the next frame capturing period. If the answer is "yes", step S277 is executed to determine, by the processing unit, the range of a time interval of the next frame capturing period according to the comparison result. It should be appreciated that the range determined in step S227 is associated with the light source luminance value to be used by the light source unit within the time interval of the next frame capturing period. Furthermore, the range determined in step S227 is different from that in step S205. Then, step S201 is executed again. On the other hand, if the determination result of step S225 is no, the light source luminance adjustment method is finished.

In addition to the aforesaid steps, the second embodiment can also execute all the operations and functions set forth in the first embodiment. The method in which the second embodiment executes these operations and functions will be readily appreciated by those of ordinary skill in the art based on the explanation of the first embodiment, and thus, will not be further described herein.

Moreover, the light source luminance adjustment method described in the second embodiment may be implemented by a non-transitory computer readable medium. The non-transitory computer readable medium has a computer program stored therein. The computer program executes the light source luminance adjustment method described in the second embodiment after being loaded into an optical processing apparatus. The computer program may be a file that can be transmitted through a network, or may be stored in a tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

Figure 3:
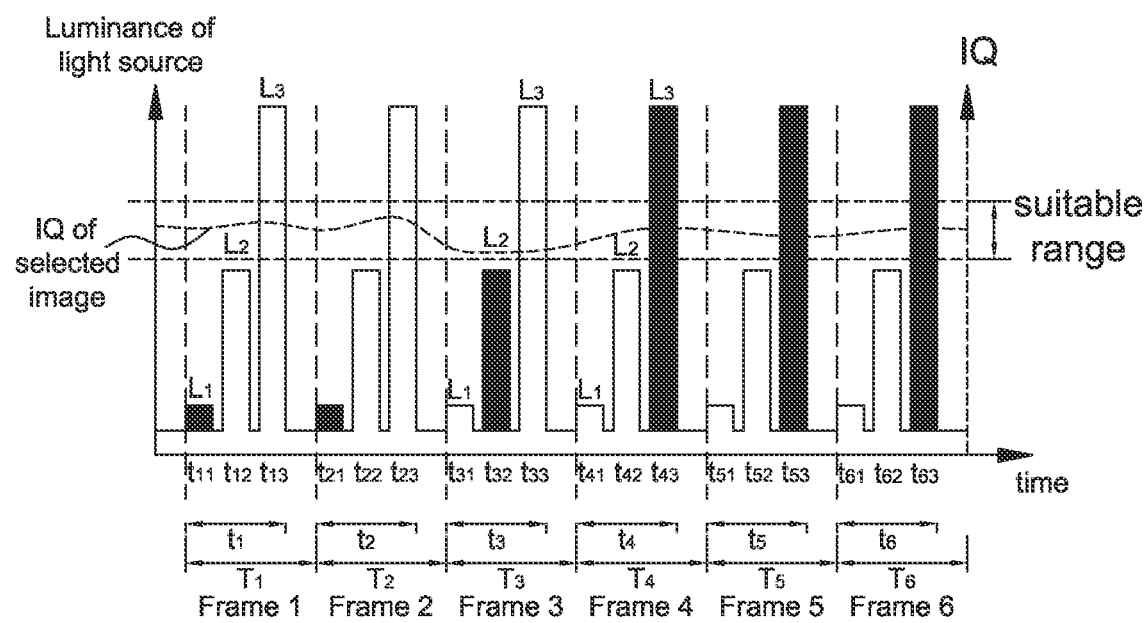
FIG. 3 is an operational schematic diagram of an optical processing apparatus in the first and second embodiments of the present disclosure.

According to the above descriptions and FIG. 3, FIG. 3 is an operational schematic diagram of an optical processing apparatus 1 in the first and second embodiments of the present disclosure. For example, FIG. 3 shows that the optical processing apparatus 1 is operated on a high reflective surface during Frames 1 and 2, and moves to a lower reflective surface during Frame 3, and is operated on a super low reflective surface during Frames 4 to 6. The present invention defines a time interval (e.g., t1~t6) within each frame capturing period (e.g., T1~T6), captures multiple images (e.g., 12a~12c, 14a~14c in FIG. 1B) with different light source luminance values (e.g., levels L1~L3) within this time interval, and further calculates the image quality index of each of the multiple images. When at least a part of the multiple images have good qualities, one of the images with a good image quality (e.g., the first image in Frames 1 and 2; the second image in Frame 3; the third image in Frames 4 to 6) is selected as the image representing this time interval, e.g., for calculating displacement. The light source luminance value used to capture the image with good image quality is set as the basic luminance value to be used by the light source unit within the next frame capturing period. When all of the images have bad image qualities, an averaged image of the images is set as the image representing this time interval, e.g., for calculating displacement, and a range of light source luminance values to be used within the next frame capturing period is duly adjusted. Since the range of luminance values to be used by the light source unit within the next frame capturing period is adjusted based on the image qualities of a current frame capturing period, it can be expected that images to be captured within the next frame capturing period will have preferable image qualities. Moreover, since the first and second embodiments adjust the light source luminance of the light source unit instead of adjusting the exposure time length used to capture images or adjusting the gain value of the programmable gain amplifier, they do not have the shortcomings of the prior art.

It should be mentioned that if all of the images captured in said next frame capturing period also have bad image qualities (e.g., out of a suitable range as shown in FIG. 3), the range of luminance values is continuously adjusted based on the image qualities of the images captured in said next frame capturing period till at least one of the images have good quality. Preferably, the image quality of at least one of the images captured in one frame capturing period is adjusted to be within the suitable range. The suitable range is determined according to the resolution and noise tolerance of the optical processing apparatus.

As mentioned above, said image representing one time interval may be used to calculate a displacement of the optical processing apparatus with respect to a reflective surface.

In one embodiment, the optical processing apparatus of the present disclosure is adapted to detect a pressing state and a rotational displacement of a button, such as a watch crown.

Figure 4:
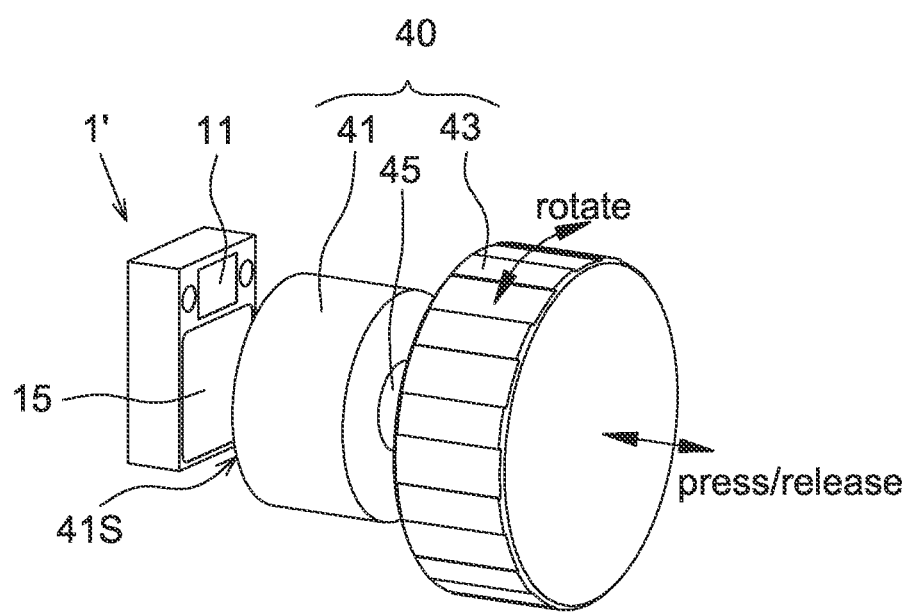
FIG. 4 is an application embodiment of an optical processing apparatus according to a third embodiment of the present disclosure.

Referring to FIG. 4, it is an application embodiment of an optical processing apparatus 1' according to a third embodiment of the present disclosure in which the optical processing apparatus 1' is adapted to detect a pressing state and a rotational displacement of a watch crown 40. In FIG. 4, the watch crown 40 is shown to include a rotary shaft 41, a rotary part 43, and a connection part 45 for connecting the rotary shaft 41 and the rotary part 43. The function and structure of a watch crown is known to the art and thus details thereof are not described therein. It should be mentioned that although FIG. 4 takes a watch crown 40 as an example for illustrating a button, the present disclosure is not limited thereto. The button may be other types having a proper structure as long as it can be pushed/pulled and rotated by a user, and has a surface to be illuminated and captured by the optical processing apparatus 1'.

Figure 5:
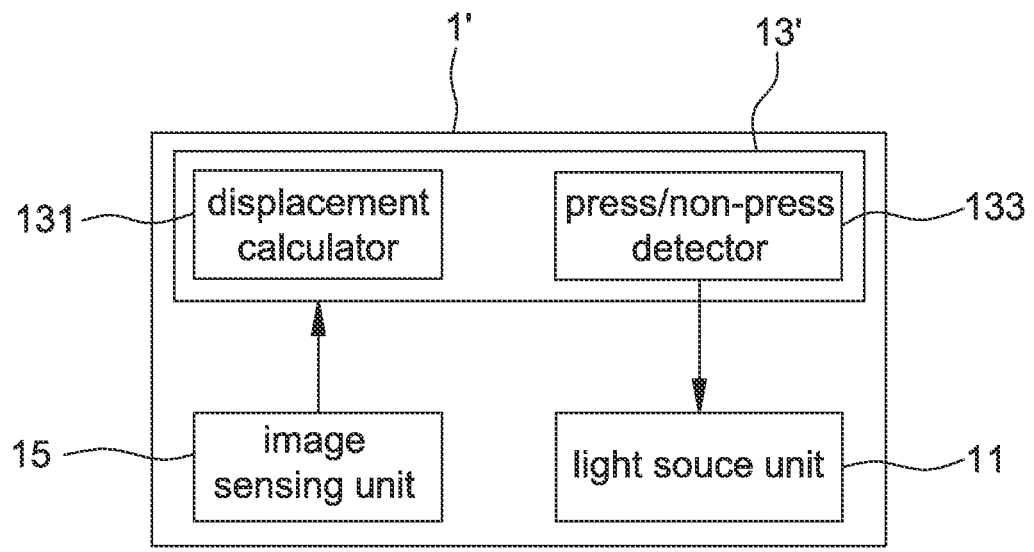
FIG. 5 is a block diagram of an optical processing apparatus according to the third embodiment of the present disclosure.

Referring to FIG. 5 together, FIG. 5 is a block diagram of an optical processing apparatus 1' according to the third embodiment of the present disclosure. The optical processing apparatus 1' includes a processing unit 13', the light source unit 11 and the image sensing unit 15. In this embodiment, the processing unit 13' further includes a displacement calculator 131 and the press/non-press detector 133. Similar to the above first and second embodiments, the processing unit 13' is a CPU, MCU or ASIC and preferably includes at least one memory device, e.g., a volatile memory and/or a nonvolatile memory, such that operations of the displacement calculator 131 and the press/non-press detector 133 are implemented by hardware codes and/or software codes operating in conjunction with the memory device. It should be mentioned that although FIG. 5 shows the displacement calculator 131 and the press/non-press detector 133 with different functional blocks, it is only intended to illustrate but not to limit the present disclosure. Operations of both the displacement calculator 131 and the press/non-press detector 133 are considered to be performed by the processing unit 13'.

In the third embodiment of the present disclosure, the displacement calculator 131, the light source unit 11 and the image sensing unit 15 performs similar operations as the optical processing apparatus 1 of the first and second embodiments, i.e., the displacement calculator 131 performing the operations of the processing unit 13 of the first and second embodiments. Operations of the light source unit 11 and the image sensing unit 15 controlled by the displacement calculator 131 in the third embodiment are similar to those in the first and second embodiments, and thus details thereof are not repeated herein.

Figure 6:
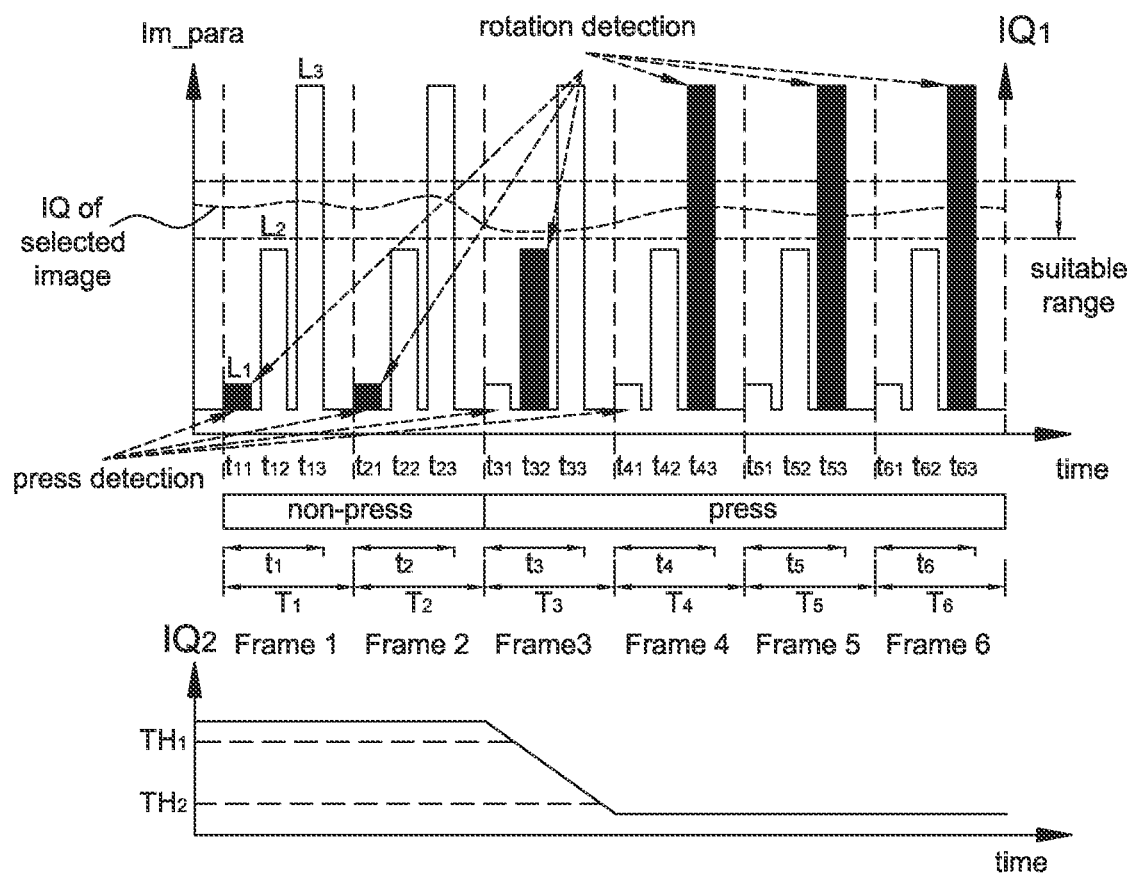
FIG. 6 is an operational schematic diagram of an optical processing apparatus according to the third embodiment of the present disclosure.

Referring to FIG. 6, it is an operational schematic diagram of an optical processing apparatus 1' according to the third embodiment of the present disclosure. Referring to FIGS. 4-6 together, the light source unit 11 is also used to provide a beam of light to a reflective surface, wherein the reflective surface in this embodiment is a surface (e.g., a bottom surface 41S of the rotary shaft 41) of the button (e.g., a watch crown 40 in FIG. 4) facing the light source unit 11. It is appreciated that it is possible to arrange the light source unit 11 to opposite to another surface of the rotary shaft 41 instead of the bottom surface 41S.

Similarly, the displacement calculator 131 (or the processing unit 13') is electrically connected to the light source unit 11, and configured to define a frame rate (e.g., 1/T1), define a plurality of first time instants (e.g., t11, t12, t13) within a first time interval (e.g., t1), and set the beam of light provided by the light source unit 11 to a luminance value (e.g., levels L1~L3) at each of the first time instants (e.g., t11, t12, t13), wherein a length of the first time interval (e.g., t1) is shorter than a reciprocal of the frame rate (e.g., T1), and the luminance values (e.g., levels L1~L3) are different and within a first range. The arrangement of the luminance values herein may take the example in the first embodiment mentioned above.

Similarly, the image sensing unit 15 is electrically connected to the displacement calculator 131 (or processing unit 13'), and configured to receive light reflected from the surface 41S of the button for capturing a first image (e.g., 12a, 12b, 12c in FIG. 1B) of the surface 41S of the button by an exposure time length at each of the first time instants (e.g., t11, t12, t13), wherein the exposure time lengths are the same in one embodiment.

The displacement calculator 131 (or processing unit 13') is also further configured to calculate an image quality index of each of the first images (e.g., 12a, 12b, 12c in FIG. 1B), compare the image quality indices of each of the first images with at least one quality threshold, and select more than one of the first images as a plurality of first temporary images to calculate the rotational displacement of the button (e.g., along an rotate direction in FIG. 4) when the image quality indices do not meet the at least one quality threshold. The displacement calculator 131 (or processing unit 13') also selects an image with a good image quality to represent the first time interval (e.g., t1) for calculating the rotational displacement when at least a part of the images have good qualities (e.g., IQ1 within a suitable range).

The operations of the light source unit 11, the displacement calculator 131 and the image sensing unit 15 in the third embodiment have been described in the above first and second embodiments (e.g., FIGS. 2A to 2C), and thus details thereof are not repeated herein.

In addition to the above operations, the optical processing apparatus 1' further has other operations performed by the press/non-press detector 133 described below. More specifically, the optical processing apparatus 1' performs all the operations of the optical processing apparatus 1 of the first and second embodiments as well as additional operations.

The press/non-press detector 133 of the processing unit 13' compares the image quality index (IQ2) of one of the first images (e.g., captured at t11, t12, t13 in FIG. 6) with at least one first press threshold (e.g., two first press thresholds TH1 and TH2 being shown in FIG. 6) to identify a pressing state of the button within the first time interval t1 (or first image capturing period T1), wherein as mentioned above the image quality index may be one of a feature value and image intensity of the images captured within the first time interval t1. In this embodiment, the one of the first images corresponds to a minimum luminance value (e.g., captured at t11 in FIG. 6) or a maximum luminance value (captured at t13 in FIG. 6) of the light source unit 11 among the first time instants (e.g., t11, t12, t13 in FIG. 6) as long as the selected one of the first images is close to saturation when the button is pressed or not pressed to obtain a maximum button linear distance.

Figures 7A, 7B:
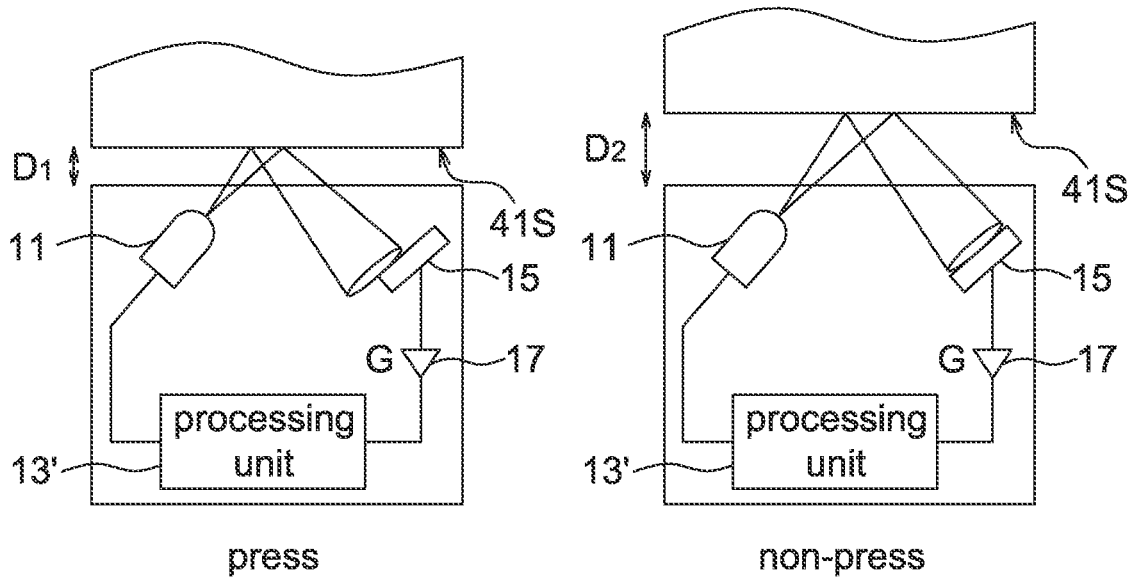
FIGS. 7A and 7B are schematic diagrams of the press/non-press states of a button.

The pressing state identified by the press/non-press detector 133 is classified into a press state and a non-press state. For example, referring to FIGS. 7A and 7B together, the light source unit 11 provides a beam of light to a surface 41S of the button, and the image sensing unit 15 receives light reflected from the surface 41S and outputs an image corresponding to each of the time instants (e.g., t11, t12, t13 in FIG. 6) within the first time interval t1. Corresponding to different distances (e.g., D1 and D2) between the button and the optical processing apparatus 1', the press/non-press detector 133 is able to identify the press state and the non-press state according to the image quality index (e.g., IQ2 in FIG. 6). In the case that the image quality index is image intensity of the images captured at each of the time instants (e.g., t11, t12, t13 in FIG. 6) within the first time interval t1, the press/non-press detector 133 identifies lower image intensity when the button is pressed (part of lights not impinging on the image sensing unit 15 as shown in FIG. 7A) and higher image intensity when the button is not pressed (most of lights impinging on the image sensing unit 15 as shown in FIG. 7B). For example, when the press/non-press detector 133 identifies that the image intensity is lower than a press threshold TH2, a press state is confirmed; on the contrary, when the press/non-press detector 133 identifies that the image intensity is higher than a press threshold TH1, which is higher than the press threshold TH2, a non-press is confirmed.

In the third embodiment, as the optical processing apparatus 1' is able to calculate a rotational displacement and a pressing state of a watch crown 40, the processing unit 1' is arranged to stop outputting the rotational displacement when the image quality index (IQ2) of the selected first image is between the press threshold TH1 and TH2 as shown in FIG. 6. In some cases, when the image quality index (IQ2) of the first image is between the press threshold TH1 and TH2, it means that the watch crown 40 is on the way being pulled or pushed between two states and thus the rotation during this transitional period may be taken as undesired movement and ignored.

Figures 8A, 8B:
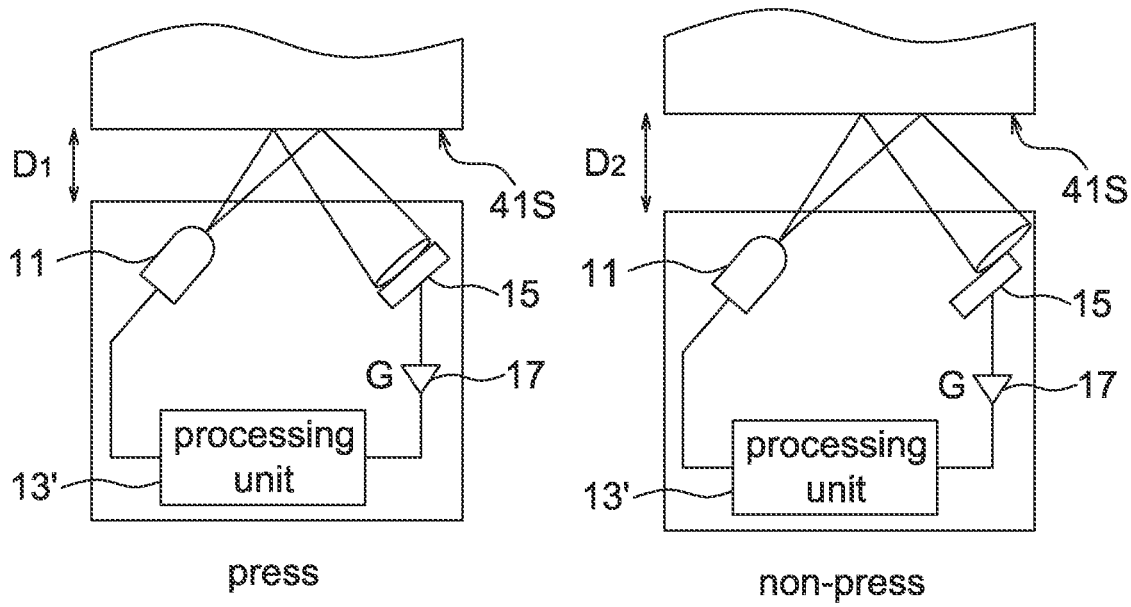
FIGS. 8A and 8B are other schematic diagrams of the press/non-press states of a button.

It is appreciated that the image quality index of the images captured at each of the time instants is determined according to the arrangement of the light source unit 11 and the image sensing unit 15. Accordingly, it is possible that the press/non-press detector 133 identifies lower image intensity when the button is not pressed (as shown in FIG. 8B) but higher image intensity when the button is pressed (as shown in FIG. 8A).

Similarly, if the optical processing apparatus 1' continuous operating, the processing unit 13' decides a second range corresponding to a second time interval (e.g., t2 in FIG. 6) according to a comparison result of comparing the image quality indices with the at least one quality threshold in the first time interval (e.g., t1 in FIG. 6), defines a plurality of second time instants (e.g., t21, t22, t23 in FIG. 6) within the second time interval t2, and sets the beam of light provided by the light source unit 11 to a luminance value at each of the second time instants (e.g., t21, t22, t23), wherein the luminance values corresponding to the second time interval t2 are different and within the second range. The image sensing unit 15 captures a second image (e.g., 14*a*, 14*b*, 14*c* in FIG. 1B) by the exposure time length at each of the second time instants (e.g., t21, t22, t23). Details of the above operations have been described in the first and second embodiments and thus are not repeated herein.

In addition to the above operations, the press/non-press detector 133 (or the processing unit 13') calculates an image quality index of each of the second images (e.g., captured at t21, t22, t23 in FIG. 6), and compares the image quality index of one of the second images with at least one second press threshold to identify a pressing state of the button within the second time interval t2, wherein the one of the second images corresponds to a minimum luminance value (e.g., t21) or a maximum luminance value (e.g., t23) of the light source unit 11 among the second time instants (e.g., captured at t21, t22, t23). If the second range is different from the first range, the at least one first press threshold is different from the at least one second press threshold, wherein the first and second press thresholds are previously arranged and stored before shipment in a memory device of the optical processing apparatus 1'.

Figure 9:
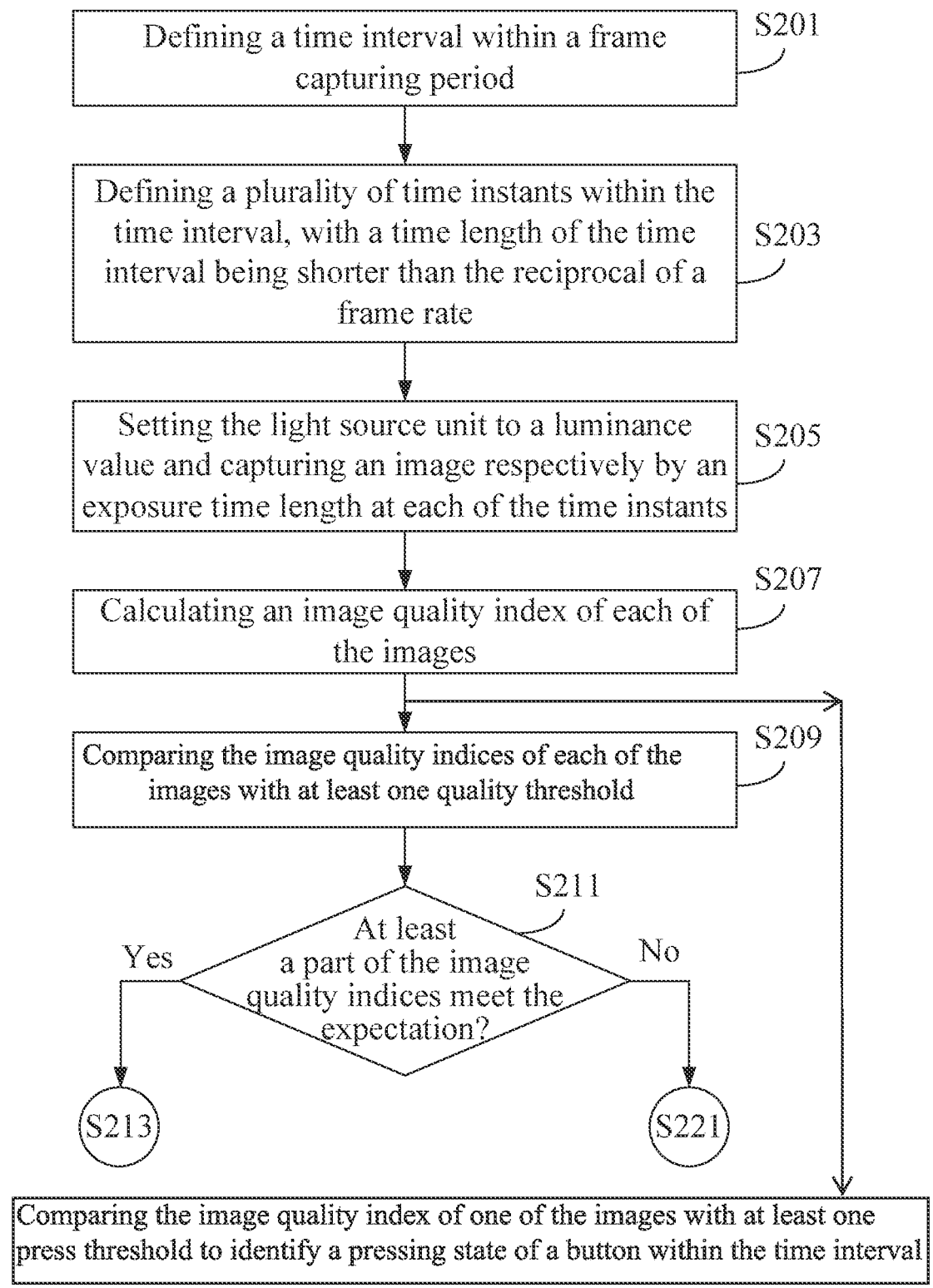
FIG. 9 is a flowchart diagrams depicting the third embodiment of the present disclosure.

In the flow chart of the light source luminance adjustment method shown in FIG. 2A, the step of comparing the image quality index of one of the first images with at least one first press threshold to identify a pressing state of the button within the first time interval may be inserted after the image quality indices are calculated as shown in FIG. 9. It should be mentioned that the pressing state is identified before, concurrently or after the steps S209, S211, S221 and S213 according to different applications. Similarly, if the optical processing apparatus 1' continuous operating, the optical processing apparatus 1' moves to a next frame capturing period (e.g., T2) and performs the steps of: calculating an image quality index of each of the second images (e.g., captured at t21, t22, t23 in FIG. 6); and comparing the image quality index of one of the second images with at least one second press threshold to identify the pressing state of the button within the second time interval (e.g., t2). More specifically, the press/non-press detector 133 identifies a pressing state within every frame capturing period (e.g., T1~T6).

In the above embodiments, the image quality index of the images captured at each time instances is determined only according to the luminance value of the light source unit 11. In other embodiments, it is also possible to control the image quality index of the images captured at each time instances according to an exposure time length and a gain value.

Referring to FIG. 6 again, in this embodiment, the processing unit 13' defines successive frame capturing periods (e.g., T1~T6), defines a plurality of time instants (e.g., t11~t13, t21~t23 . . . t61~t63) within a time interval (e.g., t1, t2 . . . t6) in each frame capturing period, wherein a length of the time interval is shorter than the frame capturing period, and sets the beam of light provided by the light source unit 11 to a luminance value (e.g., levels L1~L3) at each of the plurality of time instants within each time interval. The image sensing unit 15 captures an image of the surface 41S of the button by an exposure time length and a gain value G of a programmable gain amplifier 17 at each of the plurality of time instants within the each time interval. It should be mentioned that although FIGS. 7A-7B and 8A-8B show that the programmable gain amplifier 17 is separated from the image sensing unit 15, it is only intended to illustrate. In some embodiments, it is possible that the programmable gain amplifier 17 is integrated in the image sensing unit 15.

In this embodiment, the displacement calculator 131 (or the processing unit 13') sets an image capture parameter (Im_para), which includes at least one of the luminance value, the exposure time length and the gain value, at each of the plurality of time instants to be different and within a predetermined range. The displacement calculator 131 then calculates an image quality index of each of the images captured (e.g., at t11~t13, t21~t23 . . . t61~t63) within the each time interval (e.g., t1-t6), and calculates the rotational displacement of the button using a second image among the images captured within the each time interval, wherein the second image is one of the images, among the plurality of time instants within the each time interval, whose image quality index meet at least one quality threshold. In other words, the displacement calculator 131 performs operations similar to those performed by the processing unit 13 in the first and second embodiments above only the luminance value of the light source unit 11 is replaced by the image capture parameter (Im_para). More specifically, it is possible to modify the image quality index by changing the luminance value of the light source unit 11, the exposure time length of the image sensing unit 15 and/or the gain value of the programmable gain amplifier 17 in this embodiment. As mentioned above, when all of the images have bad image qualities, an averaged image of the second images is set as the image representing one time interval for calculating the rotational displacement.

The press/non-press detector 133 compares the image quality index of a first image among the images captured within the each time interval with at least one press threshold to identify a pressing state of the button within the each time interval, wherein the first image corresponds to a minimum image capture parameter (e.g., minimum luminance value, exposure time length or gain value) or a maximum image capture parameter (e.g., maximum luminance value, exposure time length or gain value) among the plurality of time instants within the each time interval. The press/non-press detector 133 may identify the pressing state in each Frame or every a predetermined number of Frames.

More specifically, in this embodiment, the first image is associated with a same time instant among the plurality of time instants within every frame capturing period, e.g., fixed as the first one image or the last one image captured within every frame capturing period. That is, the position of the first image among the plurality of images within each time interval is not adaptively changed during operation.

However, the second image is selected according to its image quality index (e.g., meeting the at least one quality threshold or not), and thus the second image is possibly associated with different time instants among the plurality of time instants within the each time interval of two adjacent frame capturing periods. For example referring to FIG. 6 again, the second image is selected as the first one in time intervals t1 and t2, as the second one in the time interval t3, and as the third one in time intervals t4 to t6.

As mentioned above, the processing unit 13' further sets the image capture parameter within a different predetermined range when the image quality indices of the images captured within one of the successive frame capturing periods do not meet the at least one quality threshold in order to adjust the image quality of at least one of the images captured within a next frame capturing period to be within a suitable range. The press threshold and quality threshold may also be changed when the image capture parameter is changed.

It is appreciated that a normal state of the button may be a press state or a non-press state according to different applications. In the present disclosure, types and values of the press threshold may or may not be identical to those of the quality threshold. In the present disclosure, a type of the image quality index to be compared with the press threshold (e.g., IQ2 in FIG. 6) may or may not be identical to that compared with the quality threshold (e.g., IQ1 in FIG. 6). In the present disclosure, the first and second ranges of the luminance value of the light source unit 11 associated with different Frames may or may not be identical.

Figure 10:
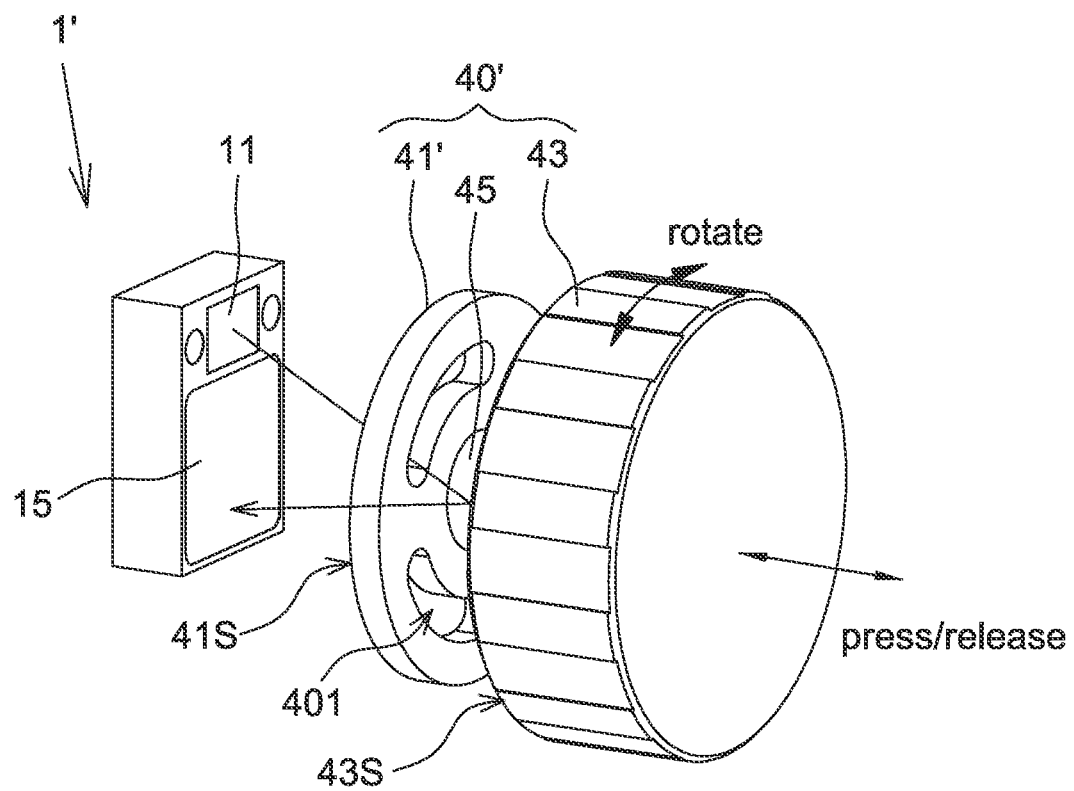
FIG. 10 is an application embodiment of an optical processing apparatus according to another embodiment of the present disclosure.

Referring to FIG. 10, it is an application embodiment of an optical processing apparatus 1' according to another embodiment of the present disclosure in which the optical processing apparatus 1' is adapted to detect a pressing state and a rotational displacement of a watch crown 40'. In FIG. 10, the watch crown 40' is also shown to include a rotary shaft 41', a rotary part 43 and a connection part 45 connecting the rotary shaft 41' and the rotary part 43.

In this embodiment, the rotary shaft 41' has a sheet form (e.g., thickness much smaller than diameter), and includes at least one through hole 401 (e.g., 2 through holes being shown in FIG. 10, but not limited thereto). The thickness of the rotary shaft 41' is not particularly limited and is determined according to different applications. Light emitted by the light source (e.g., light source unit 11) goes through the through hole 401 of the rotary shaft 41' to propagate to a bottom surface 43S of the rotary part 43. The reflected light beam is captured by the image sensor (e.g., light sensing unit 15) to output images of the bottom surface 43S of the rotary part 43 of the button. More specifically, FIG. 10 is different from FIG. 4 only by replacing the rotary shaft 41 by a sheet form with at least one through hole 401 thereon, and other operations performed by the light source unit 11, the light sensing unit 15 and the processing unit 13 or 13' are not changed. Some arrangement of the light source, the image sensor and the button are described below.

Figure 11:
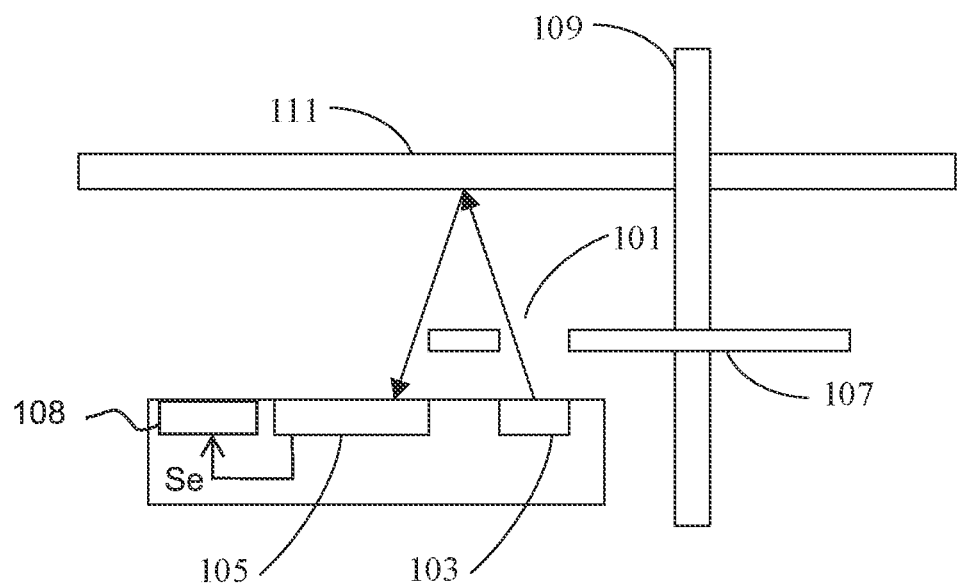
FIG. 11 is a cross sectional view of an optical structure according to another embodiment of the present disclosure.

Referring to FIG. 11, it is a cross sectional view of another embodiment of the present disclosure. In FIG. 11, the rotatable device (e.g., the button mentioned above) is shown to have at least one plane, e.g., a rotatable plane 107 (e.g., the rotary shaft 41' shown in FIG. 10). At least one through hole 101 (e.g., the through hole 401 shown in FIG. 10) is formed on the rotatable plane 107 to allow light emitted by a light source 103 to go through. The emitted light illuminates an object 111 (e.g., the rotary part 43 shown in FIG. 10) at the other side of the rotatable plane 107 and reflected light is generated. The optical sensor 105 detects the reflected light and generates electrical signals Se by optical sensing. The electrical signals Se are used to indicate whether the rotatable plane 107 is rotated to a predetermined position, e.g., calculated by the processor 13 or 13' mentioned in the first to third embodiments. The rotatable plane 107 rotates by a shaft 109 (e.g., the connection part 45 shown in FIG. 10).

In a non-limiting aspect, at least one of the rotatable plane 107 and the object 111 is a gear, and the shaft 109 is a gear shaft. The shaft 109 is driven by a motor or by a user to rotate at least one of the rotatable plane 107 and the object 111 at a predetermined or changeable rotating speed.

In this aspect, a diameter of the through hole 101 is not a limitation. As long as the light can go through, even a tiny hole is adaptable to the present disclosure. In order to cause the optical sensor 105 not to detect reflected light when the thorough hole 101 is not aligned with the light source 103, a space between the rotatable plane 107 and the light source 103 should be very small, preferably smaller than 0.2 mm to block the propagation of light therebetween. In this way, if the through hole 101 does not pass the above space of the light source 103, the reflected light is not detected by the optical sensor 105.

It should be mentioned that said through hole 101 being aligned with the light source 103 (i.e. rotating to a predetermined position) is not limited to that the through hole 101 is right above the light source 103. According to an emission direction of the light source 103, the through hole 101 is arranged to deviate toward the optical sensor 105. More specifically, in the present disclosure, when the rotatable plane 107 is rotated to the predetermined position, the at least one through hole is right above the light source 103, or between upper space of the light source 103 and the optical sensor 105.

For example, FIG. 11 shows that the optical sensor 105 is arranged outside an edge of the rotatable plane 107, and thus the optical sensor 105 does not receive reflected light (referred to the light after being reflected by the object 111) from the object 111 via the at least one through hole 101. In an aspect having a larger through hole that exposes a part of the light source 103 and a part of the optical sensor 105, the optical sensor 105 is arranged under the rotatable plane 107. The positional relationship between the light source 103, the optical sensor 105 and the object 111 is arranged flexibly as long as the optical sensor 105 detects light reflected by the object 111.

Figure 12:
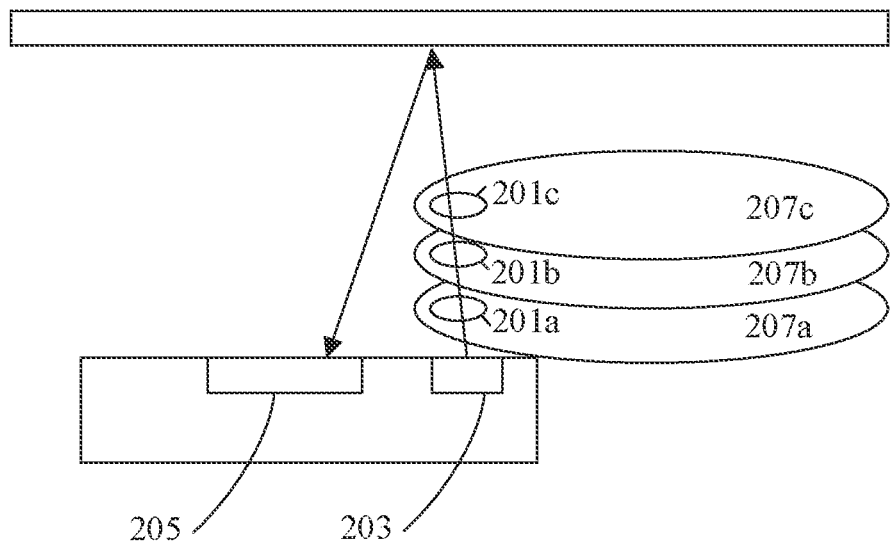
FIG. 12 is another embodiment of the present disclosure which has multiple rotatable elements.

FIG. 12 is another embodiment of the present disclosure, and a difference thereof from the embodiment of FIG. 11 is that multiple rotatable planes 207a, 207b and 207c (e.g., each as one rotary shaft 41' shown in FIG. 10) are shown in FIG. 12, and at least on through hole (e.g., the through hole 401 shown in FIG. 10) is formed on each rotatable plane (FIG. 12 showing one through hole on each rotatable plane).

In this embodiment, light emitted by the light source 203 penetrates the through holes 201a, 201b and 201c when these through holes are aligned to allow the optical sensor 205 to detect the reflected light. That is, the rotatable planes 207a, 207b and 207c are all rotated to a predetermined position and the positioning is accomplished. In this embodiment, as long as the multiple through holes have an overlapped area, the light can go through, and this is one benefit of the optical detection. As the through hole for the light penetration does not have the volume limitation, high accuracy is not extremely required in manufacturing these through holes.

Furthermore, the rotatable plane 207a is the first plane to limit the propagation of emitted light, and thus the rotatable plane 207a should be arranged very close to the light source 203 as mentioned in the embodiment of FIG. 11.

In a non-limiting aspect, the rotatable planes 207a, 207b and 207c have different sizes, radiuses and/or rotating speeds. Every a predetermined time interval, the through holes 201a, 201b and 201c overlap once to allow the light emitted by the light source 203 to go through every through hole 201a, 201b and 201c to be reflected by the above object.

In a non-limiting aspect, the optical sensor 205 has a sensing array. When the light emitted by the light source 203 goes through the through hole 201a but is unable to pass the through hole 201b and is reflected by the rotatable plane 207b (e.g., a lower surface thereof), a light spot is formed at a first location of the sensing array. When the light emitted by the light source 203 goes through the through holes 201a and 201b but is unable to pass the through hole 201c and is reflected by the rotatable plane 207c (e.g., a lower surface thereof), a light spot is formed at a second location (different from the first location) of the sensing array. When the light emitted by the light source 203 goes through the through holes 201a, 201b and 201c and is reflected by the above object, a light spot is formed at a third location (different from the first and second locations) of the sensing array. Accordingly, a processing unit (e.g., a digital signal processor) identifies positions of the rotatable planes 207a, 207b and 207c according to a location of the light spot in the image frame outputted by the sensing array. In this embodiment, the light source 203 is preferably a light source having high directivity.

Figure 13:
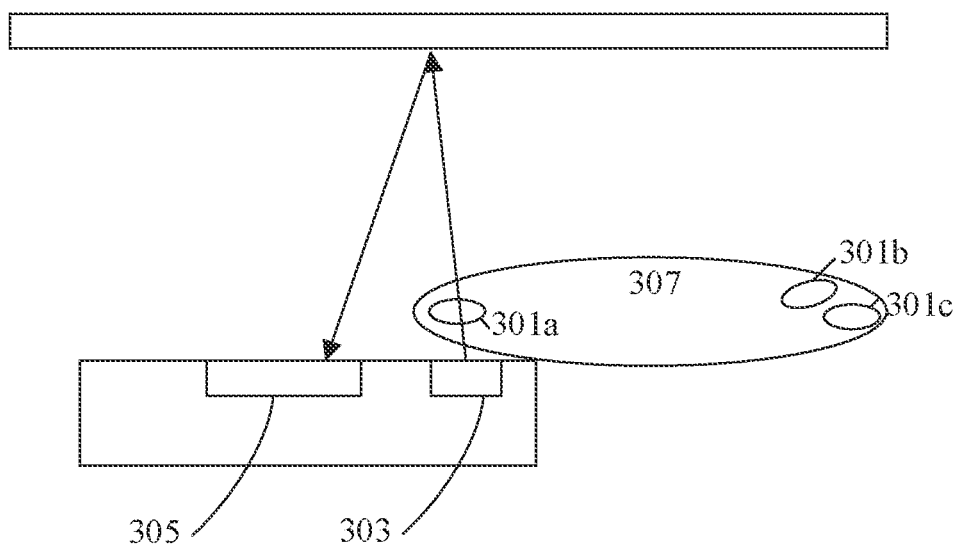
FIG. 13 is another embodiment of the present disclosure, in which multiple through holes are formed at different positions of a rotatable element.

FIG. 13 is another embodiment of the present disclosure, and a difference thereof from the embodiment of FIG. 11 is that multiple through holes 301a, 301b and 301c (e.g., the through hole 401 shown in FIG. 10) arranged with a predetermined relative distance from one another are formed at different positions on a same rotatable plane 307 (e.g., the rotary shaft 41' shown in FIG. 10). The space between the multiple through holes is used to locate different positions of the rotatable plane 307. For example in this embodiment, the through hole 301b is very close to the through hole 301c. Accordingly, when the rotatable plane 307 is rotating, and if the optical sensor 305 successively receives reflected light, which is generated by light source 303, having a magnitude larger than a threshold twice (within a predetermined time interval), it means that the rotatable plane 307 is rotated to a position of the through hole 301b or 301c depending on the rotating direction. However, when the rotatable plane 307 is rotating, and if the optical sensor 305 receives reflected light having a magnitude larger than a threshold once, it means that the rotatable plane 307 is rotated to a position of the through hole 301a.

Figure 14:
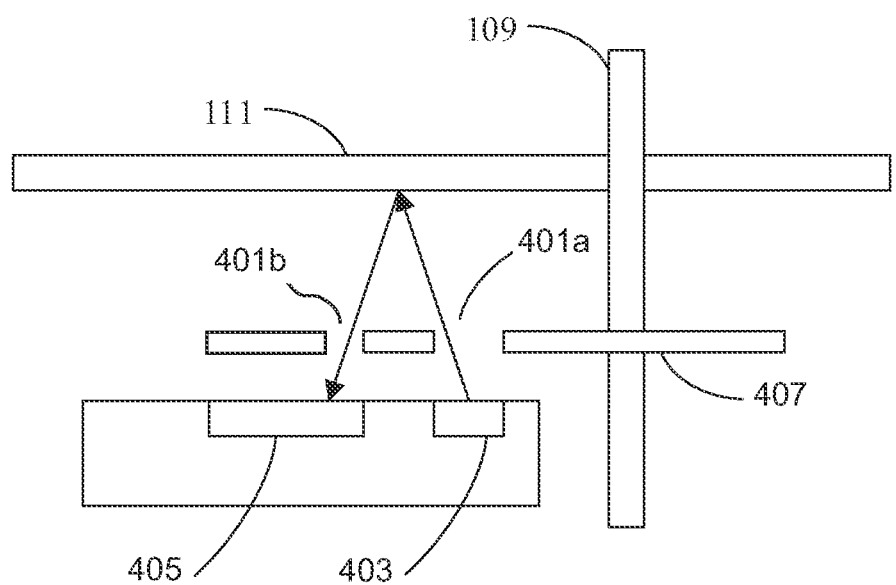
FIG. 14 is a cross sectional view of an optical structure according to another embodiment of the present disclosure.

FIG. 14 is a cross sectional view of another embodiment of the present disclosure, which shows two through holes 401a and 401b (e.g., the through hole 401 shown in FIG. 10) are formed on one rotatable plane 407 (e.g., the rotary shaft 41' shown in FIG. 10). The first through hole 401a allows the emitted light of the light source 403 to go through to reach the above object 111. The second through hole 401b allows the reflected light to go through to impinge on the optical sensor 405. The first through hole 401a and the second through hole 401b have identical or different sizes and/or shapes without particular limitations as long as when the light source 403 and the optical sensor 405 are aligned with the first and second through holes 401a and 401b respectively, the emitted light from the light source 403 is reflected by the object 111 and then received by the optical sensor 405. As mentioned above, the rotatable plane 407 is very close to the light source 403 and the optical sensor 405.

Figure 15:
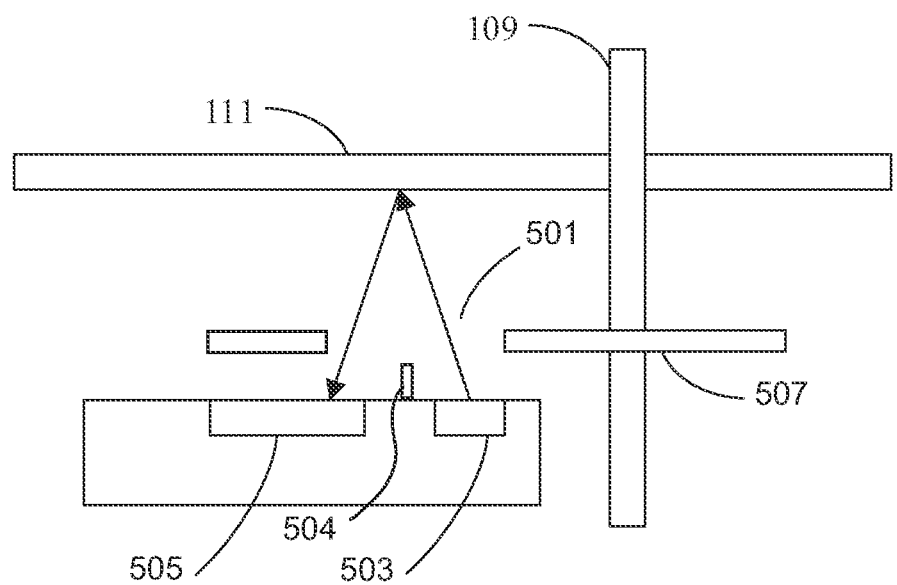
FIG. 15 is a cross sectional view of an optical structure according to another embodiment of the present disclosure.

FIG. 15 is a cross sectional view of another embodiment of the present disclosure, which shows that a rotatable plane 507 (e.g., the rotary shaft 41' shown in FIG. 10) has a single large through hole 501 (e.g., the through hole 401 shown in FIG. 10) to allow the emitted light of the light source 503 and the reflected light from the above object 111 to go through the same through hole 501. As mentioned above, the rotatable plane 507 is very close to the light source 503 and the optical sensor 505.

As mentioned above, according to the spatial arrangement of the light source 503, the through hole 501 and the optical sensor 505, the through hole 501 is located above a part or the whole of the light source 503 and the optical sensor 505, or located between upper space of the light source 503 and the optical sensor 505 when the rotatable plane 507 is rotated to the predetermined position.

In this embodiment, in order to prevent the emitted light of the light source 503 from being directly received by the optical sensor 505, preferably an opaque light blocking wall 504 is disposed between the light source 503 and the optical sensor 505.

In a non-limiting aspect, the above light sources 103-503 (e.g., the light source 11 shown in FIG. 10) are light emitting diodes or laser diodes that emit light of an identifiable spectrum, e.g., infrared light and/or red light. The optical sensors 105-505 (e.g., the image sensor 15 shown in FIG. 10) are CMOS image sensors, photodiodes or other sensors for sensing light energy. The light sources 103-503 and optical sensors 105-505 are integrated in a control chip with a digital signal processor 108 (referring to FIG. 11), and the control chip and the object 111 are arranged at different sides of a rotatable plane, wherein the digital signal processor 108 is used to control the light sources 103-503 to emit light and control the optical sensors 105-505 to detect light, which is converted to electrical signals, corresponding to light emission of the light sources 103-503.

In other words, in the present disclosure the reflection object is arranged at one side of at least one rotatable plane (as shown in FIGS. 11-15), and the light source and optical sensor are located at the other side of the at least one rotatable plane. The light source is used to emit light toward the at least one rotatable plane. When the at least one rotatable plane is rotated to a predetermined position, emitted light of the light source goes through at least one through hole to project on the reflection object. The optical sensor is used to receive reflected light from the reflection object.

In a non-limiting aspect, the digital signal processor identifying whether the alignment is fulfilled is to, for example, calculate a magnitude of the electrical signal and compares the calculated amplitude with a threshold. When the amplitude exceeds the threshold, the through hole of the rotatable plane 107-507 is identified to be aligned with the light source and/or the optical sensor which is referred as positioning the rotatable plane herein. For example, in FIGS. 11 and 12, the digital signal processor 108 compares the amplitude of the electrical signals with a threshold to position the rotatable plane 107, 207a-207c. For example in FIG. 13, the digital signal processor 108 positions the rotatable plane 307 according to a number of times of the amplitude variation of the electrical signals. As mentioned above, the amplitude is larger than the threshold for once when the rotation position is corresponded to the through hole 301a, and the amplitude is larger than the threshold for twice within a predetermined time interval when the rotation position is corresponded to the through holes 301b and 301c.

In a non-limiting aspect, the digital signal processor 108 further controls the light source 103-503 to turn on and turn off, and controls the optical sensor 105-505 to acquire a bright image when the light source is turned on and acquire a dark image when the light source is turned off. Then the digital signal processor 108 calculates a differential image between the bright image and the dark image, and identifies whether the rotatable plane is rotated to the predetermined position according to a comparison result by comparing amplitude of the differential image with the threshold to further improve the detection accuracy.

In the above embodiments, to specify the light of the light source, a filter is formed on the optical sensor or in the through hole such that only the light of a specific wavelength is detectable thereby improving the sensing efficiency.

The present disclosure is adaptable to set time of a watch (e.g., a satellite watch or GPS watch). When the watch receives a correct time signal (e.g., the watch having a communication interface for communicating with a station), hour and minute hands of the watch are moved to correct positions by using the present disclosure to accomplish the time setting. In addition, the present disclosure is further adaptable to an instrument panel using a spinning indicator or setting a gear to an original position, e.g., the panel for indicating flow rate and used electricity or the conveyor system for conveying goods by rotating gears.

Referring to FIG. 11 again, for example when the watch, which includes the optical structure in FIGS. 11-15, receives the correct time signal, the shaft 109 is controlled by a motor (not shown) to rotate the rotatable plane 107 to cause the through hole 101 to be aligned with the light source 103, i.e., controlling the rotatable plane 107 to be rotated to a calibration position according to the correct time signal. In some conditions, the rotatable plane 107 is not rotated to a correct calibration positon (i.e. the predetermined position) due to some problems when the watch receives the correct time signal. In this case, the digital signal processor 108 further identifies whether the amplitude of the electrical signal exceeds the threshold when the rotatable plane 107 is rotated to the calibration position in order to identify whether the calibration position is identical to the predetermined position or not. When the amplitude of the electrical signal does not exceed the threshold, the control chip continuously rotates the rotatable plane 107 and counts a time interval to a next time that the through hole 101 is aligned with the light source 103 (e.g., using a counter to count a time interval before the amplitude of the electrical signal exceeding the threshold next time) so as to obtain a deviation angle of the rotatable plane 107. The deviation angle is stored in a memory (also in the control chip) as a calibration amount. In this way, when the watch receives the correct time signal again, the motor rotates the rotatable plane 107 to the calibration position plus or minus the calibration amount to cause the through hole 101 of the rotatable plane 107 to be correctly aligned with the light source 103. The process of storing the calibration amount is implemented by software and/or hardware codes in a calibration mode, which is entered by pressing a button or via a selection menu by a user.

In a non-limiting aspect, a surface of the rotatable plane 107 facing the light source 103 and the optical component 105 is covered with light absorbing material such that when the through hole 101 is not aligned with the light source 103, the reflection is reduced to lower the noise.

In a non-limiting aspect, a surface of the object 111 facing the light source 103 and the optical sensor 105 is covered with light reflective material (especially for reflecting the emitted light of the light source 103) to improve the reflection efficiency.

In a non-limiting aspect, a light reflecting structure (e.g., a mirror) for directing reflected light to a specific direction (e.g., a direction to the optical sensor 105) is arranged on a surface of the object 111 facing the light source 103 and the optical sensor 105 to arrange the relative position of the light source 103 and the optical sensor 105 according to different requirements.

In a non-limiting aspect, positions of the light source 103 and the optical sensor 105 in FIG. 11 are exchanged such that the optical sensor 105 receives reflected light from the object 111 only when the through hole 101 is aligned with the optical sensor 105. In this aspect, the light source 103 emits light continuously, and preferably an upper surface of the rotatable plane 107 is covered with light absorbing material such that when the through hole 101 is not aligned with the optical sensor 105, the light emitted by the light source 103 is absorbed to reduce the interference.

In a non-limiting aspect, the optical structure in FIG. 11 includes multiple light sources each being associated with a through hole, and each through hole has a corresponding optical sensor. The digital signal processor identifies the rotation position (or rotation angle) according to the sensing results of different optical sensors.

It should be mentioned that every non-limiting aspect illustrated above using FIG. 11 as an example is also adaptable to FIGS. 12-15.

In addition, although the rotatable plane mentioned above is described by a plane, the present disclosure is not so limited. The rotatable plane is a suitable rotatable element (e.g., a gear), a part surface of which is a flat surface formed with other structures protruding or recessing from the flat surface as long as the structures do not influence the rotation thereof.

In one aspect, when the rotary shaft 41' is very close to the light source 11 and the image sensor 15, as mentioned above the image sensor 15 is unable to receive reflected light from the bottom surface 43S of the rotary part 43 when the light emitted by the light source 11 does not penetrate the through hole 401. Accordingly, the processor (e.g., 13) does not calculate the rotational displacement of the button when the brightness of the captured image of the image sensor 15 is lower than a predetermined threshold. In this case, in order to allow the button to be pressed by a user, the rotary part 43 is arranged to be able to change a distance from the rotary shaft 41', e.g., a structure being formed on the connection part 45 (e.g., including two tubes having different diameters and with or without a spring inside the two tubes) or inside the rotary part 43 (e.g., with or without a spring between the rotary part 43 and the connection part 45). When the rotary part 43 is pressed, the distance between the rotary shaft 41' and optical processing apparatus 1' is not changed, but only the distance between the rotary shaft 41' and the rotary part 43 is changed. When the rotary part 43 is released, the rotary part 43 is recovered to its original position by the spring or by pulling the rotary part 43. In this aspect, the processor 13 calculates the rotational displacement and identifies the press/non-press using the same process as mentioned in the first to third embodiments according to the reflected light beam reflected from the surface of the rotary part 43 of the button. When the rotary part 43 is rotated by a user, the connection part 45 and the rotary shaft 41' is rotated simultaneously.

In another aspect, the rotary shaft 41' is not so close to the light source 11 and the image sensor 15 such that the processor 13 calculates the rotational displacement of the button in both scenarios that the light emitted by the light source 11 goes through or does not go through the through hole 401. In this case, the image sensor 15 preferably has a large sensing area. For example, when the light emitted by the light source 11 goes through the through hole 401, the images captured by the image sensor 15 has lower brightness; whereas, when the light emitted by the light source 11 does not go through the through hole 401, the images captured by the image sensor 15 has higher brightness. A brightness threshold is previously set such that the processor 13 distinguishes the images being captured between the above two scenarios. In this aspect, the button is pressed in two ways, one of which is to change the distance between the rotatory shaft 41' and the optical processing apparatus 1', and the other way is to change the distance between the rotatory shaft 41' and the rotary part 43 as mentioned above. In this aspect, the processor 13 controls a first operation of an electronic device according to first rotational displacement calculated from the images captured when the light emitted by the light source 11 penetrates the through hole 401, and controls a second operation of an electronic device according to second rotational displacement calculated from the images captured when the light emitted by the light source 11 does not penetrate the through hole 401, wherein the first operation and the second operation are different operations or the same operation but with different changing degrees, e.g., changing 1 scale corresponding to the first rotational displacement and changing multiple scales corresponding to the second rotational displacement, or vice versa. In this aspect, the processor 13 calculates the rotational displacement using the same process as mentioned in the first to third embodiments according to the reflected light beam reflected from the surface of the rotary shaft 41' or the rotary part 43 of the button. In this aspect, the light source 11 preferably has a better directivity, e.g., a laser diode.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An optical processing apparatus, comprising:
   a light source configured to provide a beam of light to go through a through hole of a rotary shaft to a surface of a rotary part of a button to generate a reflected light beam reflected from the surface of the rotary part of the button;
   an image sensor, configured to capture the reflected light beam to output a first image of the surface of the rotary part of the button by an exposure time length within a frame capturing period; and
   a processor, configured to
      calculate an image quality index of the first image,
      compare the image quality index of the first image with at least one press threshold to identify a pressing state of the button within the frame capturing period,
      calculate a rotational displacement of the button using first image frames of multiple frame capturing periods, and
      when identifying that the pressing state of the button is between press and non-press by comparing the image quality index with the at least one press threshold, take the rotational displacement calculated between the press and the non-press as undesired movement.

2. The optical processing apparatus of claim 1, wherein the image quality index is one of a feature value and image intensity of the first image.

3. The optical processing apparatus of claim 1, wherein the button is a watch crown.

4. The optical processing apparatus of claim 3, wherein the button further comprises another rotary shaft rotatable with respect to the rotary shaft, and the another rotary shaft has another through hole at a same radius as the through hole on the rotary shaft.

5. The optical processing apparatus of claim 3, wherein the rotary shaft comprises another through hole at a different side from the through hole on the rotary shaft.

6. The optical processing apparatus of claim 1, wherein the light source provides the beam of light at a same luminance value corresponding to the first image frames of the multiple frame capturing periods.

7. An operating method of a watch, the watch comprising a light source, an image sensor and a processor, and the operating method comprising:
   providing, by the light source, a beam of light to go through a through hole of a rotary shaft to a surface of a rotary part of a button to generate a reflected light beam reflected from the surface of the rotary part of the button;
   capturing, by the image sensor, the reflected light beam to output a first image of the surface of the button within a frame capturing period;
   calculating, by the processor, an image quality index of the first image;
   comparing, by the processor, the image quality index of the first image with at least one press threshold to identify a pressing state of the button within the frame capturing period;
   calculating a rotational displacement of the button using first images of multiple frame capturing periods; and
   stop outputting the calculated rotational displacement when the pressing state of the button is identified between press and non-press by comparing the image quality index with the at least one press threshold.

8. The operating method of claim 7, wherein the image quality index is one of a feature value and image intensity of the first image.

9. The operating method of claim 7, wherein the button is a watch crown.

10. The operating method of claim 9, wherein the button further comprises another rotary shaft rotatable with respect to the rotary shaft, and the another rotary shaft has another through hole at a same radius as the through hole on the rotary shaft.

11. The operating method of claim 9, wherein the rotary shaft comprises another through hole at a different side from the through hole on the rotary shaft.

12. The operating method of claim 7, wherein the light source provides the beam of light at a same luminance value corresponding to the first image frames of the multiple frame capturing periods.

13. The operating method of claim 7, further comprising:
comparing, by the processor, brightness of the first image frame with a brightness threshold to distinguish whether the beam of light going through the through hole or not.

14. The operating method of claim 7, further comprising:
rotating, by the processor, the button to cause the through hole to rotate to a predetermined position after receiving a correct time signal.

* * * * *